(12) United States Patent
Lotan

(10) Patent No.: US 10,704,874 B2
(45) Date of Patent: Jul. 7, 2020

(54) PROJECTILE, AND SYSTEM AND METHOD FOR STEERING A PROJECTILE

(71) Applicant: ISRAEL AEROSPACE INDUSTRIES LTD., Lod (IL)

(72) Inventor: Asher Lotan, Yehud (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 105 days.

(21) Appl. No.: 15/768,943

(22) PCT Filed: Oct. 25, 2016

(86) PCT No.: PCT/IL2016/051156
§ 371 (c)(1),
(2) Date: Apr. 17, 2018

(87) PCT Pub. No.: WO2017/072764
PCT Pub. Date: May 4, 2017

(65) Prior Publication Data
US 2018/0306563 A1    Oct. 25, 2018

(30) Foreign Application Priority Data
Oct. 28, 2015 (IL) .......................... 242320

(51) Int. Cl.
*F42B 10/66* (2006.01)
*F41G 7/22* (2006.01)
(Continued)

(52) U.S. Cl.
CPC ............ *F42B 10/663* (2013.01); *F41G 7/226* (2013.01); *F41G 7/2286* (2013.01);
(Continued)

(58) Field of Classification Search
CPC ........ F42B 10/663; F42B 10/54; F42B 10/26; F42B 12/365; F42B 10/38; F41G 7/303;
(Continued)

(56) References Cited

U.S. PATENT DOCUMENTS 3,088,407 A    5/1963  Gallagher et al.
3,202,382 A    8/1965  Chubb
(Continued)

FOREIGN PATENT DOCUMENTS

WO    2006103647 A1    10/2006

OTHER PUBLICATIONS

International Search Report and Written Opinion for International Application No. PCT/IL2016/051156 dated Jan. 25, 2017.
(Continued)

*Primary Examiner* — Bernarr E Gregory
(74) *Attorney, Agent, or Firm* — Dorsey & Whitney

(57) ABSTRACT

A projectile is disclosed, having: a longitudinal axis, a steering assembly, a shell body, an attitude control system, a despin module, an electromagnetic receiver and/or emitter system, and a controller. The attitude control system includes a ram air inlet in selective open fluid communication with an exhaust assembly, which includes a plurality of exhaust outlets to selectively generate each of a plurality of thrust jets from a ram air inflow provided by the ram air inlet, each thrust jet being selectively controllable via the controller. The despin module is configured for selectively de-spinning the steering assembly with respect to the shell body about the longitudinal axis. The electromagnetic receiver and/or emitter system is configured for receiving and/or emitting electromagnetic energy, and for cooperating with the controller for operating the exhaust assembly to
(Continued)

thereby selectively provide steering control moments. Systems and methods for steering the projectile are also disclosed.

20 Claims, 10 Drawing Sheets

(51) Int. Cl.
*F42B 10/26* (2006.01)
*F41G 7/30* (2006.01)
*G01S 13/88* (2006.01)
*F42B 10/54* (2006.01)
*G01S 17/88* (2006.01)
*G01S 13/00* (2006.01)

(52) U.S. Cl.
CPC .......... *F41G 7/2293* (2013.01); *F41G 7/303* (2013.01); *F41G 7/306* (2013.01); *F42B 10/26* (2013.01); *G01S 13/883* (2013.01); *F42B 10/54* (2013.01); *G01S 17/88* (2013.01)

(58) Field of Classification Search
CPC ........ F41G 7/306; F41G 7/226; F41G 7/2286; F41G 7/2293; F41G 7/346; G01S 13/883; G01S 17/88
See application file for complete search history.

(56) References Cited

U.S. PATENT DOCUMENTS

| | | | |
|---|---|---|---|
| 3,208,383 A | 9/1965 | Larson | |
| 3,235,204 A | 2/1966 | Shu | |
| 3,325,121 A | 6/1967 | Banaszak et al. | |
| 3,485,173 A | 12/1969 | Morgan | |
| 3,977,629 A | 8/1976 | Tubeuf | |
| 4,104,000 A | 8/1978 | Fleischmann | |
| 4,128,060 A | 12/1978 | Gawlick et al. | |
| 4,155,521 A | 5/1979 | Evans et al. | |
| 4,193,567 A | 3/1980 | Mccarty | |
| 4,347,996 A | 9/1982 | Grosso | |
| 4,373,688 A | 2/1983 | Topliffe | |
| 4,428,293 A * | 1/1984 | Botwin | F42B 10/38 102/381 |
| 4,431,150 A | 2/1984 | Epperson | |
| 4,522,357 A | 6/1985 | Bains et al. | |
| 4,533,094 A | 8/1985 | Geis et al. | |
| 4,537,371 A | 8/1985 | Lawhorn et al. | |
| 4,565,340 A | 1/1986 | Bains | |
| 4,573,648 A * | 3/1986 | Morenus | F42B 10/663 102/503 |
| 4,577,812 A | 3/1986 | Platus | |
| 4,641,801 A | 2/1987 | Lynch et al. | |
| 4,678,142 A | 7/1987 | Hirschfeld | |
| 4,679,748 A | 7/1987 | Blomqvist et al. | |
| 4,681,283 A | 7/1987 | Kranz | |
| 4,685,639 A | 8/1987 | Bains | |
| 4,690,351 A | 9/1987 | Beckerleg et al. | |
| 4,711,152 A | 12/1987 | Fortunko | |
| 4,728,057 A | 3/1988 | Dunne | |
| 4,796,834 A | 1/1989 | Ahlstroem | |
| 4,840,328 A | 6/1989 | Sundermeyer | |
| 4,925,130 A | 5/1990 | Kranz | |
| 4,951,901 A | 8/1990 | Dunne | |
| 5,091,730 A | 2/1992 | Cardiasmenos et al. | |
| 5,102,065 A | 4/1992 | Couderc et al. | |
| 5,131,602 A | 7/1992 | Linick | |
| 5,788,178 A | 8/1998 | Barrett | |
| 5,788,180 A | 8/1998 | Sallee et al. | |
| 5,917,442 A | 6/1999 | Manoogian | |
| 7,296,520 B1 * | 11/2007 | McMullen, Jr. | F42B 12/365 102/214 |
| 7,781,709 B1 | 8/2010 | Jones et al. | |
| 7,891,298 B2 | 2/2011 | Minick et al. | |
| 8,076,623 B2 | 12/2011 | Dryer | |
| 8,080,771 B2 | 12/2011 | Shai | |
| 8,193,476 B2 | 6/2012 | Olden et al. | |
| 8,450,668 B2 | 5/2013 | Maynard et al. | |
| 8,648,285 B2 * | 2/2014 | Rastegar | F41G 7/306 102/473 |
| 2002/0190155 A1 | 12/2002 | Lipeles et al. | |
| 2008/0061188 A1* | 3/2008 | Morris | F42B 10/54 244/3.23 |
| 2008/0142591 A1* | 6/2008 | Jenkins | F41G 7/346 235/411 |
| 2010/0237185 A1* | 9/2010 | Dryer | F42B 10/26 244/3.22 |
| 2014/0197270 A1 | 7/2014 | Morgan et al. | |
| 2014/0224921 A1 | 8/2014 | Morgan et al. | |

OTHER PUBLICATIONS

International Preliminary Report on Patentability for International Application No. PCT/IL2016/051156 dated Feb. 6, 2018.

* cited by examiner

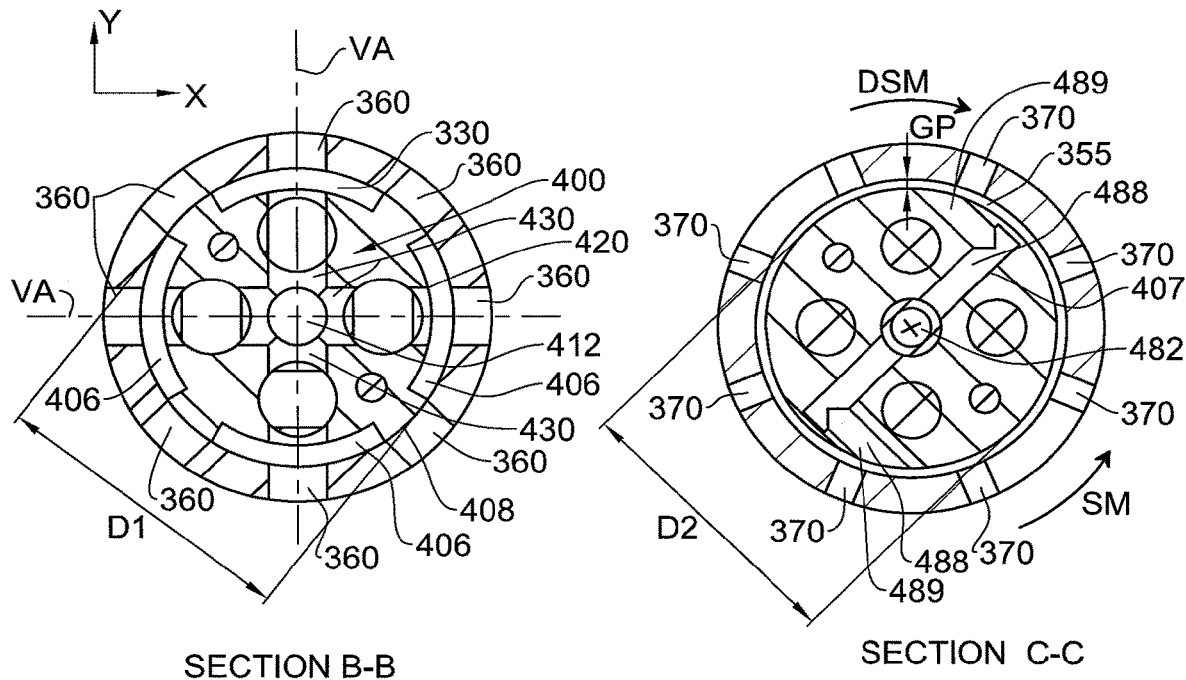
SECTION B-B
FIG. 3
SECTION C-C
FIG. 4
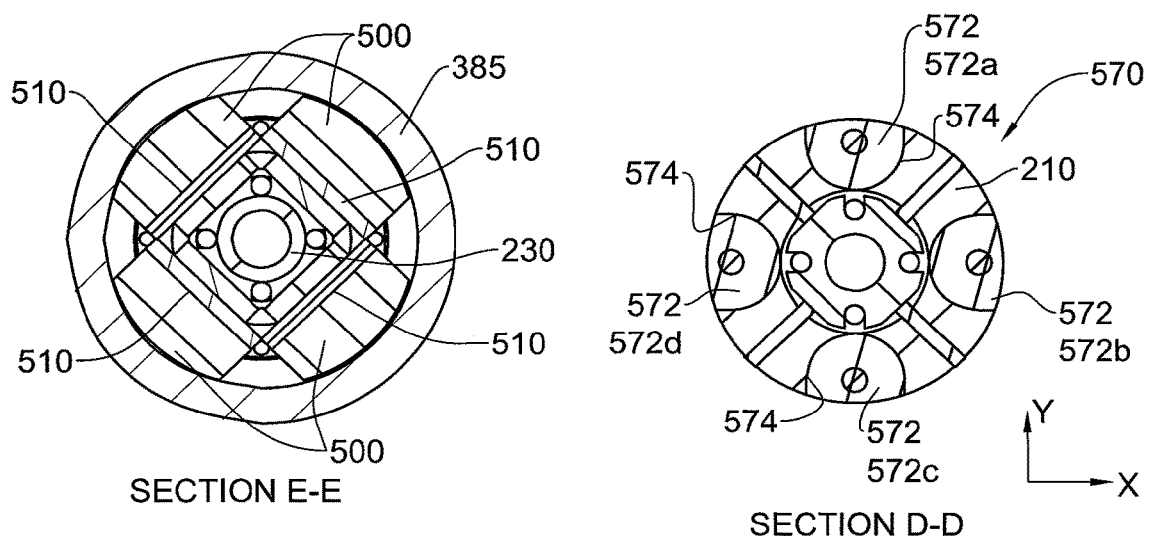
SECTION E-E
FIG. 5
SECTION D-D
FIG. 6

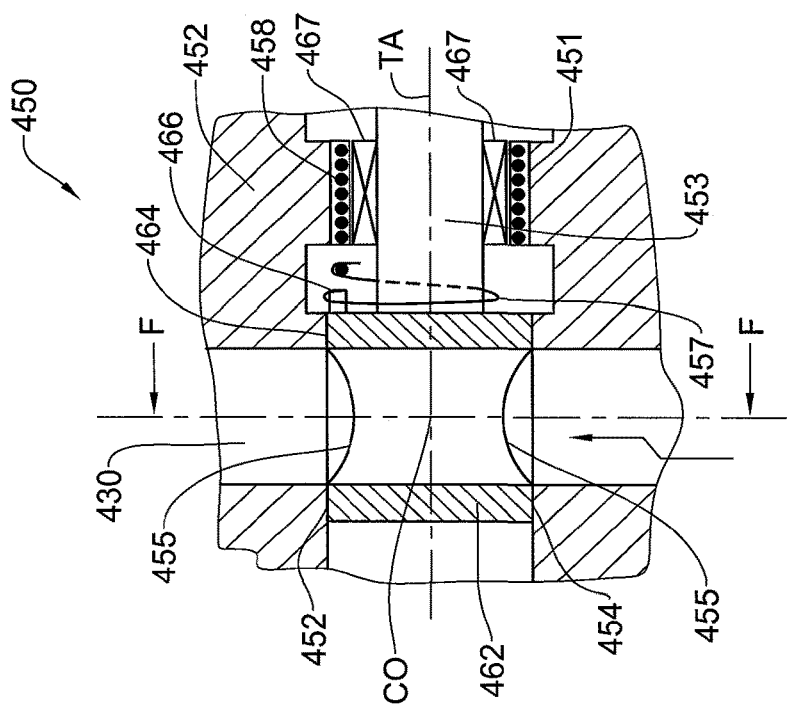
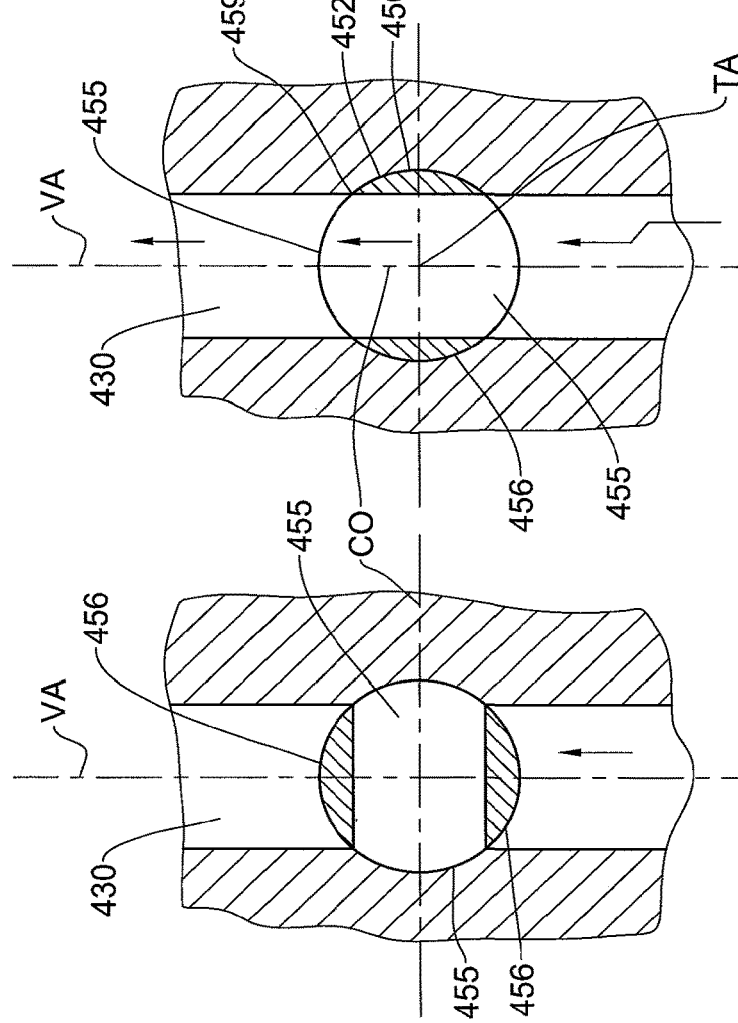
FIG. 7(a)
FIG. 7(b)
FIG. 7(c)

SECTION G-G

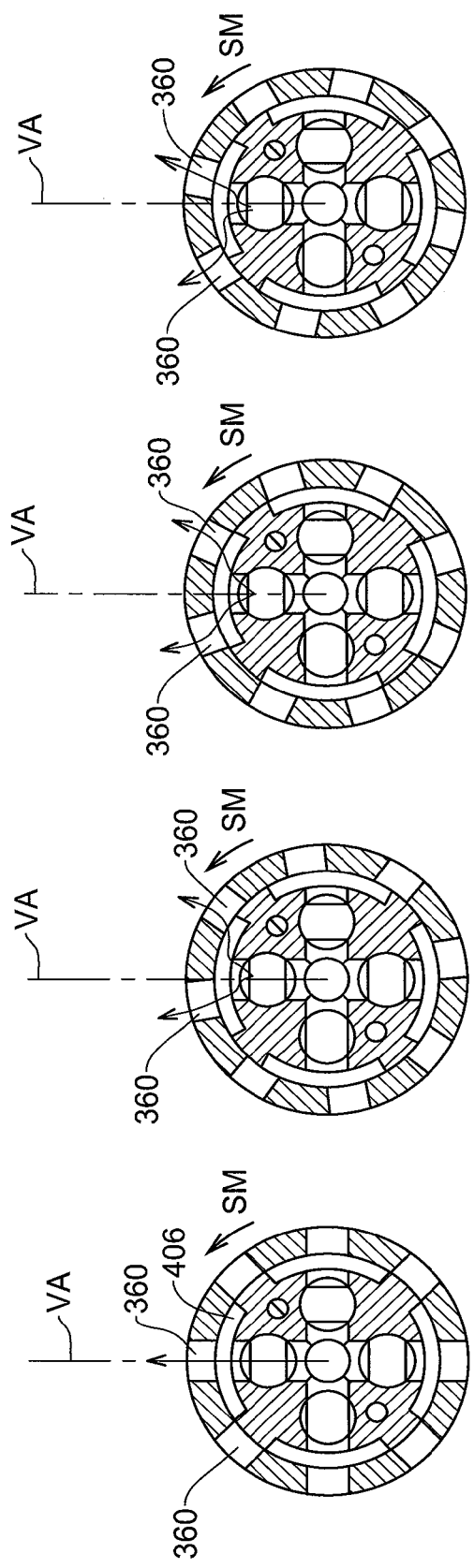

PROJECTILE, AND SYSTEM AND METHOD FOR STEERING A PROJECTILE

TECHNOLOGICAL FIELD

The presently disclosed subject matter relates to projectiles, steering systems, and steering methods, in particular for steering projectiles travelling through a fluid medium.

BACKGROUND ART

References considered to be relevant as background to the presently disclosed subject matter are listed below:
  U.S. Pat. No. 8,080,771
  U.S. Pat. No. 7,891,298
  U.S. Pat. No. 7,781,709
  U.S. Pat. No. 5,788,180
  U.S. Pat. No. 5,788,178
  U.S. Pat. No. 5,131,602
  U.S. Pat. No. 5,102,065
  U.S. Pat. No. 4,951,901
  U.S. Pat. No. 4,685,639
  U.S. Pat. No. 4,681,283
  U.S. Pat. No. 4,678,142
  U.S. Pat. No. 4,641,801
  U.S. Pat. No. 4,565,340
  U.S. Pat. No. 4,537,371
  U.S. Pat. No. 4,522,357
  U.S. Pat. No. 4,347,996
  U.S. Pat. No. 4,193,567
  U.S. Pat. No. 4,128,060
  U.S. Pat. No. 3,977,629

Acknowledgement of the above references herein is not to be inferred as meaning that these are in any way relevant to the patentability of the presently disclosed subject matter.

BACKGROUND

Projectiles fired from a weapons barrel in the atmosphere naturally travel along generally ballistic trajectories. The shape of the trajectory is influenced by gravity, aerodynamic forces acting on the projectile including environmental conditions e.g. wind and/or atmospheric contaminants.

The term "shallow trajectories" is commonly applied to cases where the projectile is fired at low elevation angles of about 20° or less, and this also referred to as very low-angle fire. The term "steep trajectories" is commonly applied to cases where the projectile is fired at elevation angles higher than about 20°, and this is also referred to as high-angle fire.

Referring to FIG. 13, a conventional projectile trajectory TJ is illustrated for a non-steered projectile. The conventional projectile trajectory TJ comprises an ascending branch AB culminating at the summit S of the trajectory, followed by a descending branch DB. While the weapons barrel WB may be set at a particular elevation angle θ, defining a line of elevation LE, the projectile typically leaves the weapons barrel WB at a different direction (the angle of departure y) the instant it leaves the weapons barrel WB, defining a line of departure LD. The projectile typically hits the ground at a corresponding angle of fall ϕ.

It is known to provide lateral steering control to bodies moving through a fluid medium, such as air for example. In some cases, such as for example projectiles, such control allows for correction of aiming errors, for maneuvering, and for compensation for wind deflection and other effects.

It is also known to provide such lateral steering via jet thrust control, in which a lateral jet thruster arrangement provides a side thrust to the projectile. Many lateral steering systems based on jet thrust techniques are known, some of which are disclosed in at least some of the above references.

GENERAL DESCRIPTION

According to a first aspect of the presently disclosed subject matter there is provided a projectile configured for moving through a fluid medium, and having a longitudinal axis, the projectile comprising a steering assembly and a shell body rotatably mounted thereto about the longitudinal axis, and including an attitude control system, a despin module, an electromagnetic receiver and/or emitter system, and a controller, wherein:
  the attitude control system comprises a ram air inlet in selective open fluid communication with an exhaust assembly via a fluid passageway provided in said steering assembly, the exhaust assembly comprising a plurality of exhaust outlets to selectively generate each of a plurality of thrust jets from a ram air inflow provided by said ram air inlet, each said thrust jet being selectively controllable via said controller to thereby generate steering control moments to the shell in operate thereof;
  the despin module is configured for selectively de-spinning said steering assembly with respect to said shell body about said longitudinal axis;
  the electromagnetic receiver and/or emitter system is configured for at least one of receiving and emitting electromagnetic energy, and for cooperating with said controller for operating said exhaust assembly to thereby selectively provide said steering control moments.

For example, said steering assembly comprises a nose portion of said shell, and wherein said ram air inlet is provided at a forward end of the nose portion. For example, said shell body comprises an external casing extending aft from a front edge thereof to an aft shell end, and wherein said front edge is axially spaced by a gap from said nose portion. For example, said aft external casing overlies an aft portion of the steering assembly, including said attitude control system and said despin module.

Additionally or alternatively, for example, said exhaust assembly comprises a plurality of shut-off valves corresponding to said plurality of said exhaust outlets, wherein each shut-off valve is controllable via said controller to selectively open or close fluid communication between the corresponding exhaust outlets and said ram air inflow provided via the ram air inlet during operation of the shell, to selectively enable said steering control moments to be generated.

Additionally or alternatively, for example, the projectile further comprises a plurality of first openings in said shell body in the vicinity of said exhaust assembly for allowing evacuation of exhaust gases generated by said attitude control system.

Additionally or alternatively, for example, said despin module comprises a generally cylindrical body including a central passageway, a central valve, and a despin thruster arrangement. For example, said fluid passageway is in selective fluid communication with central passageway via said central valve. For example, said despin thruster arrangement comprises two exhaust passageways extending from said central valve, each exhaust passageway comprising a respective tangential exhaust outlet at an outer end thereof for selectively generating thereat a tangential jet thrust from a ram air inflow selectively provided by said ram air inlet via said central valve. For example, the projectile further comprises a plurality of second openings in said shell body in the vicinity of said despin module for allowing evacuation of exhaust gases generated by said despin thruster arrangement.

Additionally or alternatively, for example, said steering assembly is rotatably mounted to said shell body via a bearing arrangement. For example, said bearing arrangement is axially located in a vicinity of said gap. For example, said bearing arrangement is configured for allowing axial movement between said steering assembly and said shell body to close said gap responsive to said shell being accelerated, and for re-opening said gap when the acceleration is terminated.

Additionally or alternatively, for example, wherein said shell body comprises a driving band made from a gliding metal.

Additionally or alternatively, for example, the projectile further comprises an electrical generator for generating electrical power during operation of the shell, responsive to a relative rotational movement between the steering assembly and the shell body. For example, said electrical generator comprises magnets provided in the shell body in lateral registry with coils provided in the steering assembly.

Additionally or alternatively, for example, said shell further comprises a tracer configuration for facilitating tracing the shell after being fired.

Additionally or alternatively, for example, said electromagnetic receiver and/or emitter system comprises a plurality of antennas. For example, said antennas are provided in said nose portion. Additionally or alternatively, for example, said antennas are conformal with an outer surface of said nose portion. Additionally or alternatively, for example, said antennas are monopole antennas. Additionally or alternatively, for example, the shell comprises four said antennas, accommodated in said nose portion in cruciform arrangement. Additionally or alternatively, for example, said antennas are configured for operating as a downlink/uplink module, operatively coupled to said controller. Additionally or alternatively, for example, said antennas are configured for receiving RF signals. For example, said controller is configured for controlling a trajectory of said shell via said attitude control system based on said RF signals when received by said antennas. For example, said RF signals are transmitted by a ground station and are configured for providing navigation instructions to said controller for controlling said trajectory; alternatively, for example, said RF signals are reflected by an illuminated target to said antennas, and wherein said controller is configured for controlling said trajectory based on differences between the RF signals received by each said antenna.

Additionally or alternatively, for example, said antennas are configured for transmitting RF signals. For example, said transmitted RF signals include information relating to at least one of the following: position of said shell, velocity of said shell.

Additionally or alternatively, for example, said shell is configured such that operation of said attitude control system to generate a thrust force by exhausting via a respective said exhaust outlets a ram airflow provided from said ram air inlet applies a control moment in at least one of pitch or yaw to the rotating shell body, which induces gyroscopic precession of said shell with respect to the longitudinal axis, and correspondingly induces a control moment to the shell in an orthogonal direction to said thrust force and said longitudinal axis to thereby correspondingly change an angle of attack of said shell, inducing an aerodynamic lateral force on said shell for changing the trajectory thereof in a desired direction.

According to a second aspect of the presently disclosed subject matter there is provided a system for steering a projectile moving through a fluid medium towards a target, the system comprising:
  at least one projectile as defined herein according to the first aspect of the presently disclosed subject matter, configured to be fired from a suitable weapons barrel;
  a sensor system, configured for providing imaging data of the fired projectile and of the target;
  a transmitter,
  a control module operatively coupled to said sensor system and to said transmitter, wherein the control module is configured for receiving image data from the sensor system and for processing these image data to selectively provide suitable control signals to said transmitter;
  wherein said transmitter is configured for transmitting course correction command signals to the projectile, responsive to receiving said control signals and corresponding thereto; and
  wherein said projectile is configured to effect a course correction responsive to receiving said course correction command signals.

For example, the system further comprises said weapons barrel.

Additionally or alternatively, for example, said sensor system includes an imaging system operating in the infra red (IR) and/or visual and/or ultraviolet spectrums.

Additionally or alternatively, for example, said sensor system is configured for selectively operating in a track lock mode, wherein the sensor system is continuously locked onto the target.

Additionally or alternatively, for example, said sensor system is configured for determining a position of the shell relative to a position of the target.

Additionally or alternatively, for example, said system is configured for firing said projectile along a shallow trajectory.

According to the second aspect of the presently disclosed subject matter there is also provided a method for steering a projectile moving through a fluid medium towards a target, the system comprising:
  providing at least one projectile as defined herein according to the first aspect of the presently disclosed subject matter;
  firing the at least one projectile from a suitable weapons barrel;
  providing imaging data of the fired projectile and of the target;
  processing said image data to selectively provide suitable control signals, and transmitting course correction command signals to the projectile based on said suitable control signals; and
  causing said at least one projectile to effect a course correction responsive to receiving said course correction command signals.

For example, said image data is provided by a sensor system, and the method comprises selectively operating sensor system in a track lock mode, wherein the sensor system is continuously locked onto the target.

Additionally or alternatively, for example, the method comprises determining a position of the shell relative to a position of the target.

Additionally or alternatively, for example, said projectile is fired along a shallow trajectory towards the target.

According to a third aspect of the presently disclosed subject matter there is provided a system for steering a projectile moving through a fluid medium towards a target, the system comprising:

at least one projectile as defined herein according to the first aspect of the presently disclosed subject matter, configured to be fired from a suitable weapons barrel;

an electromagnetic illuminator configured for illuminating the target with electromagnetic energy such that said fired projectile can receive reflected electromagnetic energy from the target;

wherein said projectile is configured to effect a course correction responsive to receiving said reflected electromagnetic energy from the target.

For example, the system further comprises said weapons barrel.

Additionally or alternatively, for example, said electromagnetic illuminator comprises an active radar or a half-active radar.

Additionally or alternatively, for example, said projectile is configured such that the antennas thereof together with the controller thereof are configured for sensing and determining the instantaneous spatial position of the target during at least a portion of the trajectory of the shell from a predetermined range from the target or from a predetermined time after being fired, and wherein the controller is configured for generating course correction command signals to the attitude control system, responsive to receiving input from the antennas.

Additionally or alternatively, for example, the system is configured for firing said projectile along a steep trajectory.

According to the third aspect of the presently disclosed subject matter there is also provided a method for steering a projectile moving through a fluid medium towards a target, the system comprising:

providing at least one projectile as defined herein according to the first aspect of the presently disclosed subject matter;

firing the at least one projectile from a suitable weapons barrel;

illuminating the target with electromagnetic energy such that said fired projectile can receive reflected electromagnetic energy from the target;

causing said at least one projectile to effect a course correction responsive to receiving said reflected electromagnetic energy from the target.

For example, said electromagnetic energy is provided by an active radar or a half-active radar.

Additionally or alternatively, for example, said projectile operates such that the antennas thereof together with the controller thereof are sense and determine the instantaneous spatial position of the target during at least a portion of the trajectory of the shell from a predetermined range from the target or from a predetermined time after being fired, and wherein the controller generates course correction command signals to the attitude control system, responsive to receiving input from the antennas.

Additionally or alternatively, for example, said projectile is fired along a shallow trajectory towards the target.

According to another aspect of the presently disclosed subject matter there is also provided a projectile is disclosed, having: a longitudinal axis, a steering assembly, a shell body, an attitude control system, a despin module, an electromagnetic receiver and/or emitter system, and a controller. The attitude control system includes a ram air inlet in selective open fluid communication with an exhaust assembly, which includes a plurality of exhaust outlets to selectively generate each of a plurality of thrust jets from a ram air inflow provided by the ram air inlet, each thrust jet being selectively controllable via the controller. The despin module is configured for selectively de-spinning the steering assembly with respect to the shell body about the longitudinal axis. The electromagnetic receiver and/or emitter system is configured for receiving and/or emitting electromagnetic energy, and for cooperating with the controller for operating the exhaust assembly to thereby selectively provide steering control moments.

A feature of at least some examples of the presently disclosed subject matter is that the shell or projectile is compatible with standard rifled weapons, which therefore do not require to be modified or replaced with specialized weapons.

Another feature of at least some examples of the presently disclosed subject matter is that the shell or projectile can be provided on any one of a number of different scales, from relative low caliber shells to relatively high caliber shells, with little or no modification being necessary other than size.

Another feature of at least some examples of the presently disclosed subject matter is that a cost effective solution is provided for a steerable shell that can be homed to a target.

Another feature of at least some examples of the presently disclosed subject matter is that a self-contained shell is provided which operates without the need for an external power source or batteries.

Another feature of at least some examples of the presently disclosed subject matter is that a shell is provided having improved accuracy over long ranges, as compared with a conventional shell of similar caliber and fired from the same weapons barrel.

Another feature of at least some examples of the presently disclosed subject matter is that, at the system level, various configurations are possible for the controlling the shell for steering the same to a desired target. For example, the particular configuration for the system can depend on the type of target.

Another feature of at least some examples of the presently disclosed subject matter is that, at the system level, the system can be configured with an external detector, which can be useful for targets with low dynamic properties, i.e. static target or low relative angular movement of the target (within FOV of the external sensor.

Another feature of at least some examples of the presently disclosed subject matter is that, at the system level, the target sensor can be incorporated in the shell, which can be useful for targets with greater dynamic movement or greater range.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which:

FIG. 2(*a*) illustrates in detail view the forward portion of the example of FIG. 2.

FIG. 3 illustrates in transverse cross-sectional side view the example of FIG. 2 taken along B-B.

FIG. 4 illustrates in transverse cross-sectional side view the example of FIG. 2 taken along C-C.

FIG. 5 illustrates in transverse cross-sectional side view the example of FIG. 2 taken along E-E.

FIG. 6 illustrates in transverse cross-sectional side view the example of FIG. 2 taken along D-D.

FIG. 7(a) illustrates in longitudinal partial cross-sectional side view a shut-off valve in the open position, according to a first example of the presently disclosed subject matter; FIG. 7(b) illustrates in transverse cross-sectional side view the example of FIG. 7(a) taken along F-F; FIG. 7(c) illustrates in transverse cross-sectional side view the example of FIG. 7(a) in the closed position.

FIGS. 10(a) to 10(d) illustrate in transverse cross-sectional side view the example of FIG. 2 taken along B-B at various relative rotational positions between the steering assembly and shell body.

DETAILED DESCRIPTION

According to a first aspect of the presently disclosed subject matter there is provided a steerable shell configured for being steered to a target.

Herein "shell" and "projectile" are used interchangeably.

Referring to FIGS. 1 to 6, a steerable shell according to a first example of the presently disclosed subject matter, generally designated 100, comprises a steering assembly 200 and a shell body 300, and has a longitudinal axis LA.

As will become clearer herein, the shell body 300 is rotatably mounted to the steering assembly 200 about longitudinal axis LA via a bearing arrangement 290.

Figure 1:
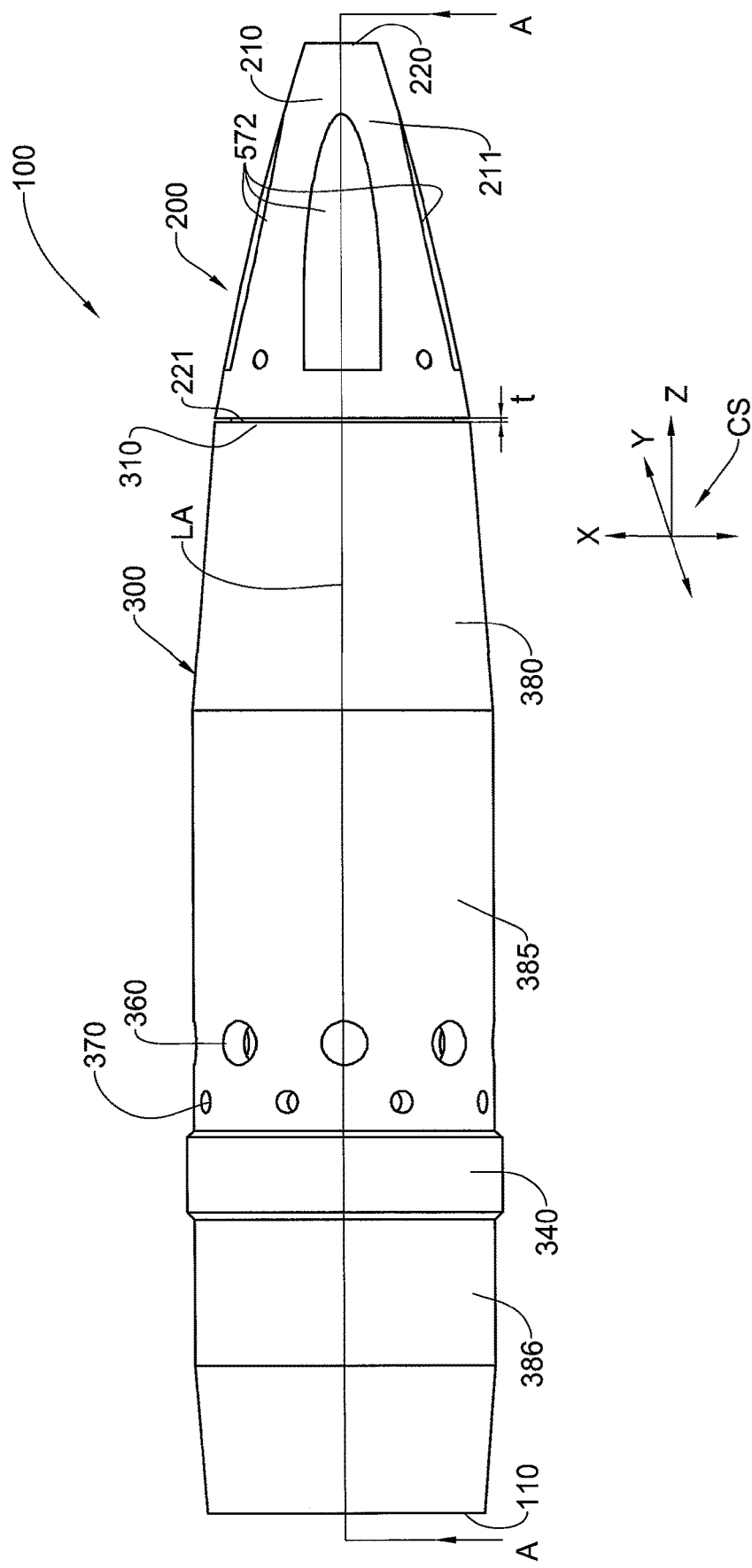
FIG. 1 illustrates in side view a first example of a projectile according to a first aspect of the presently disclosed subject matter.

For convenience, and referring to FIG. 1 in particular, a Cartesian orthogonal axes system CS can be defined for the shell 100, including three orthogonal axes x, y, z. The z-axis is along the longitudinal axis LA (and defined the roll axis or spin axis of the shell), while the x-axis and the y-axis are orthogonal to one another and to the longitudinal axis LA. The pitch axis of the shell 100 is parallel to or co-axial with the x-axis, while the yaw axis of the shell 100 is parallel to or co-axial with the y-axis.

The shell 100 comprises an attitude control system 400, despin module 480, controller 500, and electromagnetic receiver and/or emitter system 570, and these features are comprised fully or partially in the steering assembly 200, as will become clearer herein.

Figure 2:
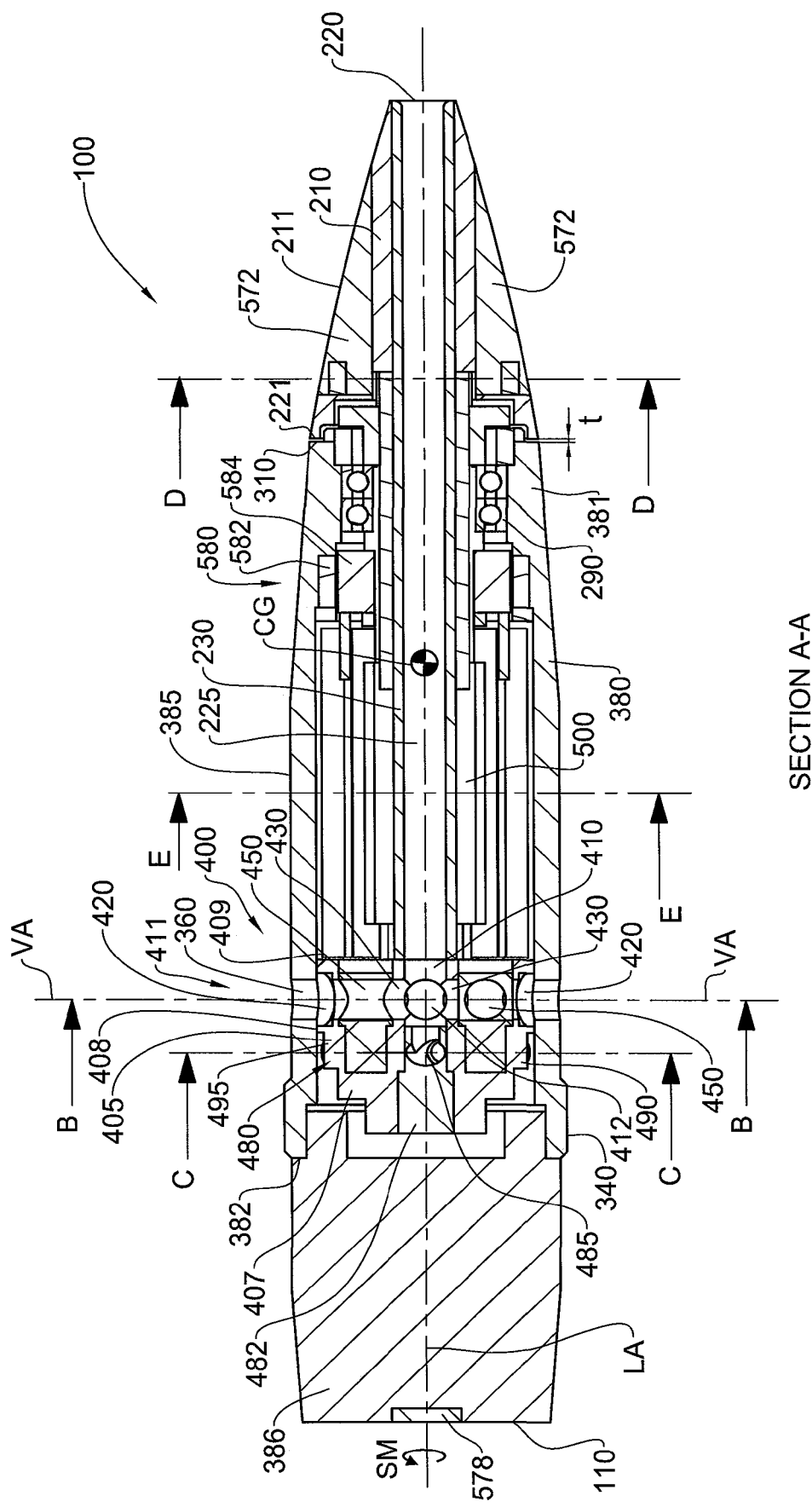
FIG. 2 illustrates in longitudinal cross-sectional side view the example of FIG. 1 taken along A-A.

Referring in particular to FIGS. 1 and 2, steering assembly 200 comprises a nose portion 210 of the shell 100, connected to the attitude control system 400 via a hollow shaft 230. The nose portion 210 has an opening at the front end thereof in the form of ram air inlet 220, which is in open fluid communication with a fluid passageway provided by the lumen 225 of the shaft 230. The nose portion 210 has a conical, ogive, rounded or otherwise aerodynamic profile, and an external surface 211 extending from the leading edge of the ram air inlet 220 to an aft edge 221 of the nose portion 210.

In this example, the lumen 225 is centrally disposed with respect to the shaft 230, and both are concentric with respect to longitudinal axis LA.

Referring also to FIG. 3, attitude control system 400 comprises an exhaust assembly 411 including a generally cylindrical body 405 having an external diameter D1 and cylindrical surface 408, a front end 409 and an aft end 407. The cylindrical body 405 has an inlet 410, extending aft into a central passageway 412. The inlet 410 is connected to and in fluid communication with the aft end of lumen 225. Four exhaust passageways 430 are formed in the cylindrical body 405, each extending radially outwardly from the central passageway 412 along respective axes VA and away from longitudinal axis LA. In this example the axes VA intersect longitudinal axis LA. Each exhaust passageway 430 comprises a respective radial exhaust outlet 420 at a radial end thereof. The four exhaust passageways 430, and thus the four corresponding exhaust outlets 420, are in cruciform arrangement and are at the same axial position (i.e. lie on the same transverse plane) with respect to longitudinal axis LA.

The exhaust assembly 411 further comprises four shut-off valves 450, one for each exhaust passageway 430. Each shut-off valve 450 is configured for selectively opening or closing the respective radial exhaust outlet 420, and thus for correspondingly selectively opening or closing fluid communication between the respective radial exhaust outlet 420 and the ram air inlet 220 (via the lumen 225, inlet 410, central passageway 412 and respective exhaust passageway 430). Thus, the shut-off valves 450 are correspondingly actuable between an open position and a closed position.

In this example, the shut-off valves 450 are normally in a closed position until actively actuated to open, and are mechanically biased to the closed position. In alternative variations of this example, the shut-off valves are instead biased in the open position until actively actuated to close. In yet other alternative variations of this example, the shut-off valves are not biased to the open or closed positions; rather, they are configured to remain in the open position or in the closed position until actively actuated to change the current position.

In this example, the shut-off valves 450 are individually and independently actuable between an open position and a closed position, and controlled via the controller 500.

Referring to FIGS. 7(a), 7(b), and 7(c), an example of shut-off valve 450 is illustrated. In this example, the shut-off valve 450 comprises an electrically driven actuator 452 coupled to valve member 454. Valve member 454 comprises a cylindrical tube 459 having a longitudinal axis TA, and closed at both axial ends by forward disc-shaped wall 462 and aft disc-shaped wall 464. The valve member 454 comprises transverse cut-outs 455 on opposite sides of the cylindrical tube 459, and aligned along an axis CO which is transverses to longitudinal axis TA. A pin or stop 466 projects axially outwards from wall 464. The cylindrical tube 459 comprises solid cylindrical wall portions 456 located between transverse cut-outs 455. The cylindrical tube 459 is rotatably mounted in the respective exhaust passageway 430 such as rotate with respect to the exhaust passageway 430 about its longitudinal axis TA, at least between an open position (FIGS. 7(a), 7(b)) and a closed position (FIG. 7(c)).

Referring to FIGS. 7(a) and 7(b), in the open position of the valve member 454 the axis CO is aligned with the axis VA of the exhaust passageway 430, and thus the transverse cut-outs 455 are aligned with the exhaust passageway 430 allowing fluid communication transversely through the cylindrical tube 459, i.e., between the central passageway 412 and the radial exhaust outlet 420.

Referring to FIG. 7(c), in the closed position of the valve member 454 the axis CO is orthogonal with the axis VA of the exhaust passageway 430, and thus the solid cylindrical wall portions 456 are aligned with the exhaust passageway 430 closing any fluid communication transversely through the cylindrical tube 459, i.e., preventing fluid communication between the central passageway 412 and the radial exhaust outlet 420.

In this example, electrically driven actuator 452 comprises a solenoid actuator 458, coupled to cylindrical tube 459 and comprising a return torsional spring 457. The solenoid actuator 458 comprises coil 451 and core 453 rotatable within the coil 451 responsive to a current flowing in the coil 451. The core 453 comprises an external magnet 467 fixed thereto. As core 453 rotates clockwise or anticlockwise about axis TA (responsive to operation of the solenoid actuator 458), the valve member 454 rotates about axis TA in a clockwise or anticlockwise direction, respectively.

When de-activated (FIG. 7(c)), the solenoid actuator 458 is biased to a closed position via the return spring 457, rotating the cylindrical tube 459 to the closed position, such that the solid cylindrical wall portions 456 are aligned with the exhaust passageway 430. When activated (FIGS. 7(a) and 7(b)) by a signal or electrical current from the controller 500, the solenoid actuator 458 rotates the core 451 against the return spring 457 (thereby torsionally stressing the same), and rotating the cylindrical tube 459 about axis TA to the open position, i.e., such that the transverse cut-outs 455 are aligned with the exhaust passageway 430. The solenoid actuator 458 and the cylindrical tube 459 stay in this position until deactivated by the controller, whereupon the solenoid 458 and the cylindrical tube 459 return to the closed position by the action of the torsion spring.

In this example, the core 453 can rotate only between two angular positions, corresponding to the valve open position and the valve closed position. For example, suitable mechanical stops can be provided to prevent further rotational movement past these angular positions. This enables the shut-off valve 450 to operate as an on-off valve.

In alternative variations of the above example of shut-off valve 450, the shut-off valve 450 is instead biased to the open position, and activation of the solenoid actuator 458 results in the valve closing to the closed position.

While in the illustrated example the exhaust outlets 420 are located axially aft of the bearing arrangement 290, in alternative variations of this example, the exhaust outlets 420 are located axially forward of the bearing arrangement 290. In yet other alternative variations of this example, one set of exhaust outlets 420 is located forward of the bearing arrangement 290, and another set of exhaust outlets 420 is located aft of the bearing arrangement 290.

Referring again to FIG. 2 and FIG. 4, the de-spin module 480 is configured for selectively de-spinning the steering assembly 200 with respect to shell body 300, about longitudinal axis LA.

In this example, the de-spin module 480 is integrally formed with the attitude control system 400, for example at aft end 407 of cylindrical body 405, the aft end 407 having a diameter D2.

The de-spin module 480 comprises a generally cylindrical body 495 including an aft central passageway 482, central valve 485, and despin thruster arrangement 490.

The aft central passageway 482 is in selective fluid communication with central passageway 412 via central valve 485.

Figure 8:
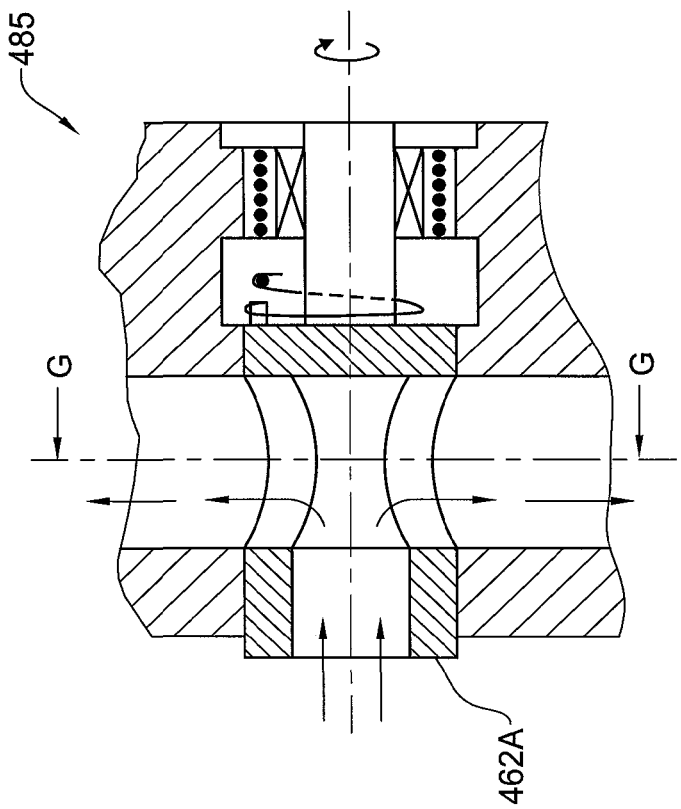
FIG. 8 illustrates in longitudinal partial cross-sectional side view a central valve in the open position, according to a first example of the presently disclosed subject matter.
Figure 9A:
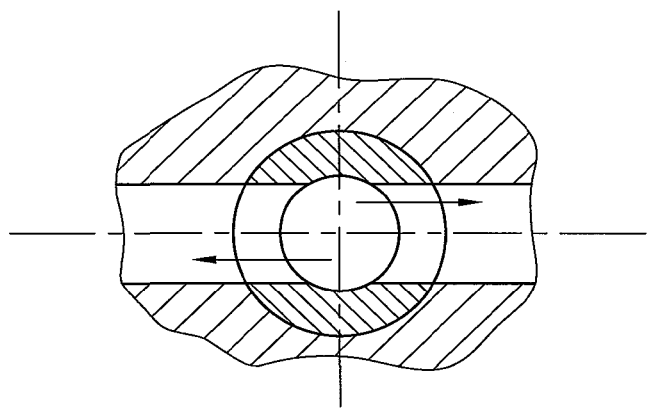
FIG. 9(a) illustrates in transverse cross-sectional side view the example of FIG. 8 taken along G-G.
Figure 9B:
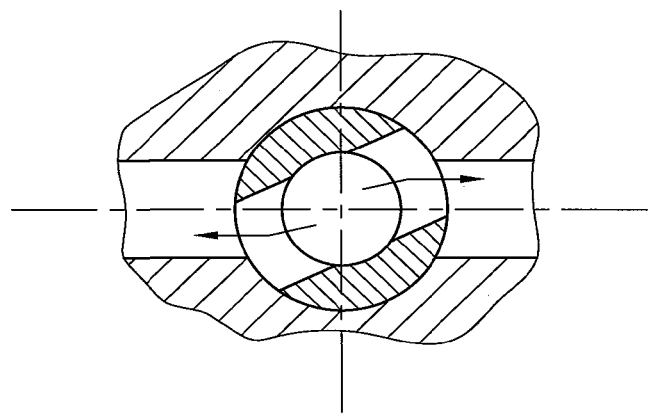
FIG. 9(b) illustrates in transverse cross-sectional side view the example of FIG. 9(a) in a partially open position.

For example, and referring to FIGS. 8, 9(a), 9(b), central valve 485 can be similar to shut-off valve 450 as disclosed herein, mutatis mutandis, but with a few differences. For example, in central valve 485 the disc-like wall 462 of shut-off valve 450 is replaced with an open end 462A.

In this example, the central valve 485 is normally in an open position (or partially open position) until actively actuated to close, and is thus mechanically biased to the open position. In alternative variations of this example, the central valve 485 is instead biased in the normally closed position until actively actuated to open. In yet other alternative variations of this example, the central valve 485 is not biased to the open or closed positions; rather, the central valve 485 is configured to remain in the open position or in the closed position until actively actuated to change the current position.

Referring to FIG. 4, the despin thruster arrangement 490 comprises two L-shaped exhaust passageways 488 formed in the cylindrical body 495. Each exhaust passageway 488 has a radial portion extending radially outwardly from the aft central passageway 482, and a tangential portion orthogonal thereto. Each exhaust passageway 488 comprises a respective tangential exhaust outlet 489 at an outer end thereof.

The two tangential exhaust outlet 489 face opposite directions. Thus when air flow from the ram air inlet 220 flows out of the exhaust outlets 489 (via the lumen 225, inlet 410, central passageway 412, central passageway 482, open central valve 485, and respective exhaust passageways 488), the exhaust outlets 489 operate as jet thrusters, generating thrust in opposite tangential directions, but each radially spaced from the longitudinal axis LA at opposite sides thereof. A rotational couple is thereby generated, inducing a spinning motion in direction DSM to the steering assembly 200.

The rotation of the core 453 is controllable by controller 500 to control and fix the angular displacement of core 453 at any desired position. Thus, central valve 485 can be operated to selectively fully allow or prevent fluid flow through central passageway 482, by opening fully or closing. Alternatively, the controller 500 can rotate the core 453 to any intermediate angular position (FIG. 9(b)) to selectively allow controlled flow rates through to the exhaust passageways 488, and thus control the spin rate of the de-spin module 480.

Thus the central valve 485 can be controlled to provide partial flow, so that the spin can be further controlled. The controller 500, via accelerometer to provide feedback, provides for stabilization of the steering assembly 200.

Referring again to FIGS. 1 and 2 in particular, shell body 300 comprises an external casing 380 of the shell 100, extending aft from a front edge 310 thereof to the aft, blunt end 110 of the shell 100. The front edge 310 is axially spaced by gap t from the nose portion 210, in particular from the aft edge 221 of the nose portion 210. The external casing 380 comprises an aft casing portion 385 and aft plug 386. The aft casing portion 385 is formed as a hollow tube of varying diameter, and having a forward open end 381 defined at front edge 310, and an aft end 382 plugged by aft plug 386.

The bearing arrangement 290 is axially located in a vicinity of gap t, and bearing arrangement 290 is configured for allowing axial movement between the steering assembly 200 and the shell body 300 to close the gap t responsive to the shell being 100 accelerated, and for re-opening the gap t when the acceleration is terminated.

The aft external casing 310 comprises driving band 340 made from a gliding metal. In this example the driving band 340 is integral with aft casing portion 385, and the gliding metal is copper, for example. When the shell 100 is fired, the pressure provided by the propellant swages the metal of the driving band into the rifling of the weapons barrel. This has two effects: proving a seal to prevent the rapidly expanding propellant from blowing past the shell 100; and causing the shell 100 to spin the shell 100 in spin direction SM (see FIG. 4) to spin-stabilize the shell 100 via the engagement of the driving band 340 with the rifling of the weapons barrel.

The aft external casing 310 overlies an aft portion of the steering assembly 200, including the attitude control system 400 and the despin module 480.

Referring also to FIG. 3, the aft external casing 310 comprises a plurality of first openings in said shell body in the vicinity of said exhaust assembly 400 for allowing evacuation of exhaust gases generated by said attitude control system 400. This plurality of first openings is, in this example, in the form of a first set of radial through-openings 360, equi-spaced circumferentially over the circumference of the aft external casing 310 and axially aligned with the axial position of the exhaust ports 420 with respect to the longitudinal axis LA. In this example, there are eight openings 360 in aft external casing 310; however, in alternative variations of this example, 2, 3, 4, 5, 6, 7, 9 or more than 9 openings 360 can be provided instead.

The radial openings 360, in cooperation with the cylindrical body 405, are configured for venting to the external airstream any airflow from each of exhaust outlets 420, in a manner such as to provide a corresponding net transverse force on the shell 100, which indirectly provides a control moment in pitch and/or yaw, as will become clearer herein.

For this purpose, the cylindrical body 405 comprises a number of circumferential channels 406 recessed inwardly from cylindrical surface 408, corresponding to the number of exhaust outlets 420. Circumferentially adjacent pairs of channels 406 are circumferentially separated by a respective partition wall 401 having external diameter D1.

The internal diameter of the internal surface 330 of aft external casing 310 at the axial location of openings 360 is slightly greater than D1, enough to provide enough clearance to allow relative rotation between the cylindrical surface 408 and the internal surface 330 without generating unacceptable frictional forces, while at the same time being small enough to minimize or prevent circumferential flow between circumferentially adjacent pairs of channels 406.

As can be seen in FIG. 3, each exhaust outlet 420 is centrally located, circumferentially, with respect to its respective channel 406, although in alternative variations of this embodiment the openings 360 can be replaced with a plurality of circumferential slots, and the channels 406 can be optionally omitted. Thus airflow from any particular exhaust outlets 420 first flows into the respective channel 406 and thereafter only out of the particular openings 360 that are in radial registry with the respective channel 406, to provide a side force to the shell 100 in yaw or pitch.

It is to be noted that when there is relative rotation between the steering assembly 200 and the shell body 300, about longitudinal axis LA, each of the openings 360 pass over a particular channel 406 once over such a spin cycle about longitudinal axis LA. In this example either one or two openings 360 are always in partial of full registry with each channel 406. For example such relative rotation can be present when the shell body 300 is spinning in spin direction SM and the steering assembly 200 is despun and thus its orientation with respect to the Earth is substantially fixed in spin.

For example, and referring to FIGS. 10(a) to 10(d), when a pitch maneuver is required controller 500 provides the necessary control inputs to the shut-off valves 450, ensuring that three shut off valves 450 are in the closed position, and one shut-off valve 450 is open to provide flow of ram air along the respective axis VA which is aligned with the desired pitch direction. Referring to FIG. 10(a), as the shell body 300 spins about the non-spinning steering assembly 200 in spin direction SM, one opening 360 is in full registry with respective channel 406; thus, airflow exiting the exhaust outlet 420 will be channeled out of this opening 360 only, and not through any of the other openings 360. The outflow of air enables the exhaust outlet 420 to operate as a jet thruster, and results in a single thrust force being generated, along a corresponding general radial direction at the instantaneous position of the opening 36.

In FIG. 10(b) the shell body 300 has turned further about longitudinal axis LA and now two openings 360 are in registry with respective channel 406—one opening 360 is in full registry, while the other opening 360 is in partial registry with respective channel 406. Thus, airflow exiting the exhaust outlet 420 will be channeled out of both of these openings 360 only, and not through any of the other openings 360.

In FIG. 10(b) both openings 360 allow exit of gases, and generate unequal radial forces, however having relatively large force components along axis VA in the desired direction, while the force components orthogonal to axis VA can at least partially cancel out as they are in opposed directions.

In FIG. 10(c) the shell body 300 has turned further about longitudinal axis LA and now two openings 360 are equidistant from exhaust outlet 420. Thus at this point the thrust generated via each of the two openings 360 are substantially equal, having relatively large force components along axis VA in the desired direction, while the force components orthogonal to axis VA fully cancel out as they are in opposed directions.

In FIG. 10(d) the shell body 300 has turned further about longitudinal axis LA and while one opening 360 is in full registry with channel 406, the adjacent opening 360 is only in partial registry with channel 406, so that there is relatively less airflow through this opening 360. Furthermore, the first opening 360 is also closer to exhaust outlet 420. Thus at this point the situation is similar to that of FIG. 10(b), and there may be a small net force component orthogonal to axis VA, but this soon disappears as the shell body 300 continues to rotate.

As the shell body 300 turns further, one to two openings 360 cyclically come into and out of registry with channel 406, enabling the required side force to be generated so long as the respective one shut-off valve 450 is open.

Similar considerations, mutatis mutandis, apply when requiring to execute a yaw, and optionally more than one shut-off valve 450 can be concurrently operated to provide complex maneuvers involving a combination of pitch and yaw.

In alternative variations of this example, at any time two or three openings 360 are always in partial of full registry with each channel 406, for example.

In this example, the exhaust outlets 420 are aft of the center of gravity CG, and thus any thrust force generated by exhausting a ram airflow via any of the exhaust outlets 420, coupled with the moment arm of the exhaust outlets 420 about the position of the bearings applies a control moment in pitch or yaw to the rotating shell body 300. In turn, this induces gyroscopic precession (nutation) of the shell 100 with respect to the longitudinal axis LA, and correspondingly induces a control moment to the shell 100 in a different, though predictable direction, typically orthogonal thereto. This causes the longitudinal axis LA to become angularly displaced with respect to the forward direction in which the shell is traveling, i.e., changes the angle of attack of the shell, which in turn results in an aerodynamic lateral force being induced on the shell 100 for changing the trajectory thereof.

Referring also to FIG. 4, the aft external casing 310 comprises a plurality of second openings in the shell body in the vicinity of the despin module 480 for allowing evacuation of exhaust gases generated by the despin thruster arrangement. The plurality of second openings is, in this example, in the form of a second set of radial through openings 370, configured for venting to the external airstream any airflow from tangential exhaust outlets 489, while minimizing or avoiding generating any net transverse force on the shell 100 thereby. In this example aft external casing 310 comprises a plurality of openings 370, equi-spaced circumferentially over the circumference of the aft external casing 310 and axially aligned with the axial position of the exhaust outlets 489 with respect to the longitudinal axis LA. In this example, there are eight openings 370 in aft external casing 310; however, in alternative variations of this example, 2, 3, 4, 5, 6, 7, 9 or more than 9 openings 370 may be provided instead. In yet other alternative variations of this example the openings 370 may be in the form of slots, for example circumferential slots.

The internal diameter of the aft external casing 310 at the axial location of openings 370 is significantly greater than D2, providing a radial gap GP between the internal surface of the aft external casing 310 and the outside of the aft end 407. This radial gap GP defines a continuous internal annular chamber 355. Thus airflow from tangential exhaust outlets 489 first flows into internal annular chamber 355 and vents substantially uniformly via all the openings 370.

In operation of the shell 100, when it is desired for the steering assembly 200 to be de-spun with respect to the Earth, the controller 500 provides the necessary control inputs to the central valve 485, enabling the same to be partially or fully open and allowing ram air to flow therethrough and out of the exhaust outlets 489 to provide a despinning couple to the steering assembly in direction DSM. With the aid of suitable sensors coupled to the controller 500, the controller maintains central valve 485 as open as required, and for as long as it is necessary, to provide the required despinning couple, such that the steering assembly 200 to be de-spun with respect to the Earth. Thereafter the central valve 485 can be actively closed, or further adjusted to maintain the steering assembly 200 de-spun with respect to the Earth. At any point in the trajectory of the shell 100, and under the control of the controller 500, the central valve 485 can be allowed to re-open to adjust the relative spin between the shell body 300 and the steering assembly 200. The controller 500 generally operates to provide further despin operation as and when needed, for example to maintain the steering assembly 200 at the same attitude/orientation about the longitudinal axis LA with respect to the Earth, while the shell body 300 continues to spin.

Referring again to FIG. 2, the steering assembly 200 is rotatably mounted with respect to shell body 300 about longitudinal axis LA via a bearing arrangement 290. In this example, the bearing arrangement comprises two roller bearings in back-to-back relationship, axially located just aft of the nose body 210. In alternative variations of this example, different bearing arrangements can be use, for example ball bearings, annular contact ball bearings, tapered roller bearings, and so on.

Figure 2A:
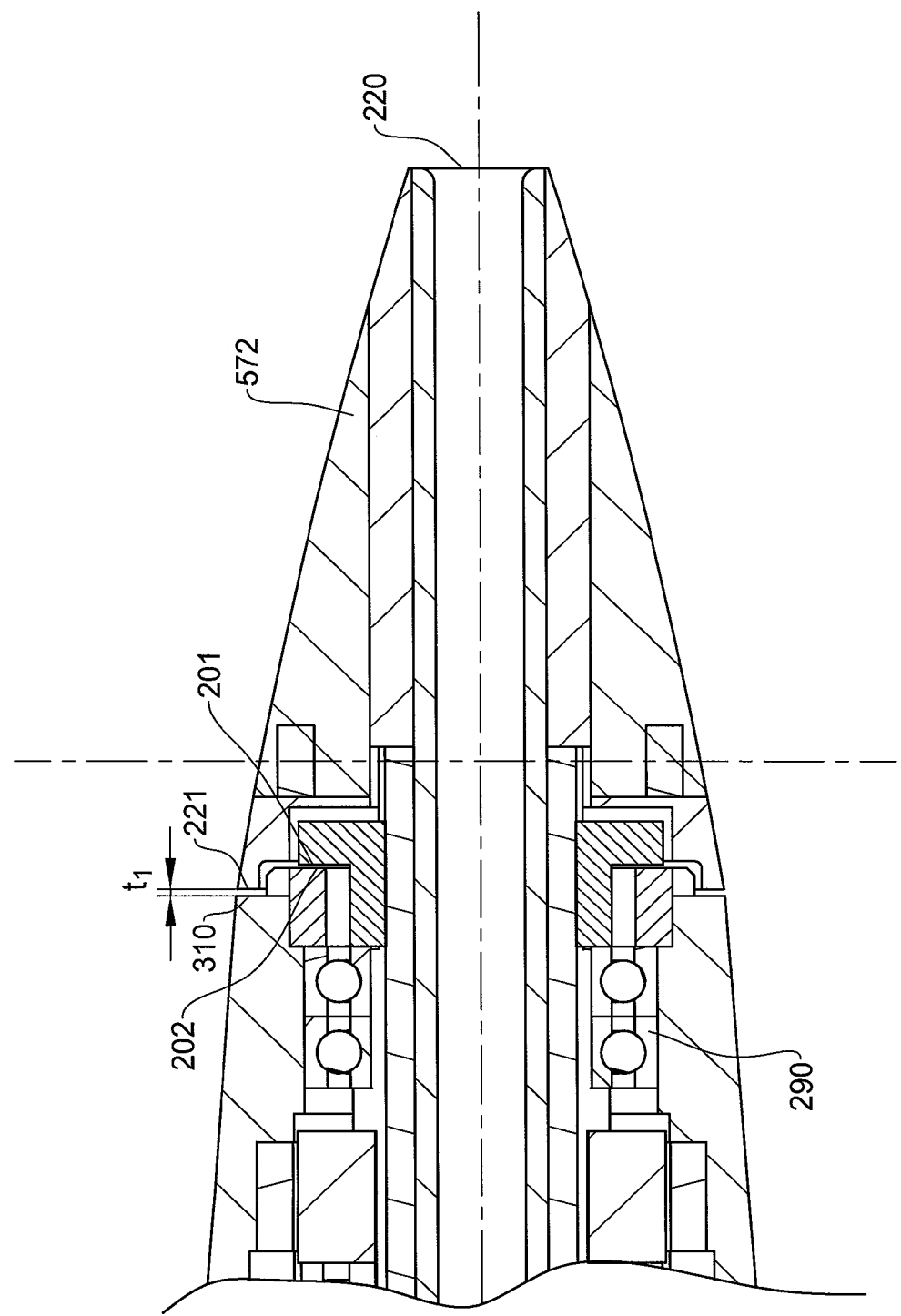

Referring in particular to FIG. 2(a), the steering assembly 200 comprises an aft-facing first abutment surface 201 forward of the bearing arrangement 290, and the shell body 300 comprises a forward-facing second abutment surface 202. Initially (prior to the shell 100 being fired), the first abutment surface 201 and second abutment surface 202 are axially spaced by a spacing smaller than spacing t1. When the shell 100 is fired, the initial acceleration causes the shell body 300 to move forward relative to the steering assembly 200, until the second abutment surface 202 comes to rest on the first abutment surface 201. This abutment of the second abutment surface 202 against the first abutment surface 201 prevents Brinnelling of the bearing arrangement 290 which could otherwise occur due to the high forces induced at filing of the shell 100.

Referring to FIGS. 2 and 6 in particular, the shell 100, and particularly the steering assembly 200, comprises the electromagnetic receiver and/or emitter system 570 for at least one of receiving and emitting electromagnetic energy. In this example, electromagnetic receiver and/or emitter system 570 comprises antennas 572 configured for receiving RF signals. While in this example, four antennas 572 are provided, in alternative variations of this example one, two, three or more than four antennas can instead be provided, for receiving RF signals or other electromagnetic energy and/or for transmitting RF signals or other electromagnetic energy.

In this example, the antennas 572 are conformal with the external surface 211 of the nose portion 210.

In this example, the antennas 572 are monopole antennas, and are accommodated in the nose portion 210 in four corresponding bays 574 in cruciform arrangement, and are therefore capable of receiving RF signals from the general forward direction (along z-axis) in four quadrants generally defined with respect the x-axis and y-axis. For further facilitating comprehension, the four antennas 572 are labeled as antennas 572a, 572b, 572c, 572d, and thus:

Antenna 572a receives RF signals along a plane defined by the z-axis and +y-axis.

Antenna 572b receives RF signals along a plane defined by the z-axis and +x-axis.

Antenna 572c receives RF signals along a plane defined by the z-axis and −y-axis.

Antenna 572d receives RF signals along a plane defined by the z-axis and −x-axis.

The electromagnetic receiver and/or emitter system 570, in particular the antennas 572, can operate as a downlink/uplink module 579 (i.e., as a downlink module and/or as an uplink module). The downlink/uplink module 579 is configured for receiving electromagnetic energy, for example RF signals or digital data, for steering the shell 100 to a desired target. The downlink/uplink module 579 is operatively coupled to the controller 500. Additionally or alternatively, the downlink/uplink module 579 can be configured for transmitting data or electromagnetic signals (e.g. RF signals), for example positional data (e.g. obtained via on-board GPS) to a ground station or control.

Referring again to FIG. 2, the shell 100 in this example further comprises an electrical generator 580 for generating electrical power to supply the electrical needs of the shell 100, in particular to power (and is thus in selective electrical communication with) the controller 500, shut-off valves 450, and central valve 485, and electromagnetic receiver and/or emitter system 570, and optionally any other radio transmitter or download link, and/or any other electrical equipment carried by the shell 100.

The electrical generator 580 comprises magnets 582 and coils 584. The magnets 582 are comprised in the shell body 300, in particular accommodated and attached to the aft casing portion 385. The coils 584 are comprised in the steering assembly 200 in particular concentrically mounted over the shaft 230. The magnets 582 and coils 584 are in lateral or radial registry, i.e. are located at the same position axially along the longitudinal axis LA. Thus, when there is a relative rotation between the steering assembly 200 and the shell body 300, electrical power is generated. For example such relative rotation can be present when the shell body 300 is spinning in spin direction SM and the steering assembly 200 is spinning at a different rate, or the steering assembly 200 is despun and thus its orientation with respect to the Earth is substantially fixed in spin.

In this example or in alternative variations of this example, an electrical battery can optionally be provided to supply electrical power to the shell 100, either initially until the electrical generator comes on line, or for replacing the electrical generator, which can thus be omitted.

In examples in which electrical power is supplied solely by the electrical generator 580, there is initially little or no electrical power generated initially when the shell 100 is fired. As will be explained in more detail below, after firing, the shell body 300 is spinning at a relative high spin rate, and induces a torque on the steering assembly 200 which spins at a lower rotational speed. The central valve 485 is configured to be biased in the normally open position, and thus airflow is automatically channeled to the exhaust outlets 489 from the ram air inlet 220 to provide a de-spinning couple to the steering assembly 200 (or at least to induce spinning in the steering assembly 200 in the opposite direction to the spin of the shell body 300), while the shell body 300 continues spinning, thereby enabling the electrical generator 580 to come on line soon and generate electrical power. Thereafter the controller 500 can further control operation of the central valve 485 to close fully or partially to thereby provide and maintain the desired rotational speed of the steering assembly 200, typically zero rotational speed with respect to the Earth. In alternative variations of this example, the central valve 485 is configured to be biased in the normally closed position. In this case, the difference in rotational speeds between the shell body 300, which is spinning at a relative high spin rate, and the steering assembly 200, which is spinning more slowly, enables the electrical generator to generate electrical power, which in turn enables the controller 500 to actively open central valve 485 and thereby to provide the desired de-spin to the steering assembly 200, as well as controlling steering of the shell 100.

Referring again to FIG. 2, and also to FIG. 5, controller 500 comprises, at least in this example, a microprocessor optionally coupled to one or more sensors—for example a gyroscopic sensor (for example in the form of MEMS) and/or one or more accelerometers (for example in the form of MEMS). Such sensors can provide feedback data to the controller 500 of the roll rate of the steering assembly 200 and/or of the shell body 300, which can be used for controlling the spin rate of the steering assembly 200 so as to remain fixed with respect to the Earth.

Optionally, the controller 500 also comprises, or is operatively connected to, a GPS module (not shown).

In at least this example the controller 500 is accommodated in one or more of four platforms, plates or cards 510 extending longitudinally outside of the shaft 230 in box-like configuration concentric therewith and centrally located axially between the nose portion 210 and the exhaust assembly 411.

The controller 500 is also operatively coupled to the electromagnetic receiver and/or emitter system 570. In applications of this example, in which the electromagnetic receiver and/or emitter system 570 comprises antennas 572 (optionally in the form of downlink/uplink module 579), the controller 500 is correspondingly operatively connected to antennas 572.

In one application of this example, the controller 500 is configured for, and thus suitably programmed for processing input received from various sensors including antennas 572, and for generating command signals for operating the attitude control system 400, in particular the exhaust assembly 411, to thereby provide correctional control moments to the shell 100.

For example one or two cards 510 are dedicated to antennas 572 (for example comprising an RF receiver), a third card 510 is dedicated to sensors, including the various MEMS and to control/stabilization functions of the controller 500 (including providing de-spin and providing control of the attitude control system 400 to provide control moments in pitch and/or yaw), and the remaining fourth card 510 is dedicated to electrical power regulation, i.e., for regulating the electrical power generated by the electrical generator 580.

For example, when the RF signals originate from a point source ahead of the shell 100 (for example the RF signals are reflected towards the shell 100 from the intended target, which can be correspondingly illuminated using a suitable illumination source—see below for example regarding the system 700 illustrated in FIG. 12). In such a case, if the longitudinal axis LA of the shell 100 is aligned so as to intersect the illuminated target, then the signal received by all four antennas 572 will be of the same phase; no corrective action needs to be taken by controller 500. However, if for example the longitudinal axis LA of the shell 100 is misaligned so as to miss the target and lie above and to the left of the target (corresponding to the quadrant defined by the +x and +y axes), then the signal received by antennas 572*a* and 572*b* will be correspondingly of different phase to the RF signals received by antennas 572*c* and 572*d*. In this manner, the controller 500, which receives input from the four antennas 572 corresponding to the phase of the RF signals received by each antenna 572, is able to determine where the target is in terms of the x- and y-axes, and correspondingly actuate the attitude control system 400 to provide correctional control moments in pitch and or yaw such as to maintain the RF signals received from all four antennas equal (within a predetermined threshold).

In another application of this example, in which the antennas 572 operate as downlink/uplink module 579, the controller 500 is configured for, and thus suitably programmed for processing input received from various sensors including downlink/uplink module 579, and for generating command signals for operating the attitude control system 400 to thereby provide correctional control moments to the shell 100.

Optionally, the shell 100 can include a tracer configuration 578, for example accommodated at the aft end of the shell body, for facilitating tracing the shell 100 after being fired—see below for example regarding the system 600 illustrated in FIG. 11.

In operation of the shell 100, the shell is fired from a rifled weapons barrel in the conventional manner, and a spin is initially applied to the shell body 300, which in turn induces a torque and causes the steering assembly 200 to also rotate in the same direction, though at least initially at a lower rotational speed. Thus, at firing the shell body 300 spins at a relatively fast rotational rate about longitudinal axis LA due to the rifling of the weapons barrel, and the steering assembly 200 receives torque from the shell body 300 via friction therebetween, since the shell body 300 and the steering assembly 200 are essentially supported together by the contact between abutment surfaces 201 and 202. Initially the central valve 485 is in the open position (or partially open position) and the shut-off valves 450 are in the closed position. After firing the shell 100, the acceleration terminates, and the shell body 300 to move aft relative to the steering assembly 200, until the second abutment surface 202 is no longer abutting the first abutment surface 201. From this point, the steering body 200 continues to spin due to frictional forces in the bearing with respect to the shell body 300, but concurrently the steering body 200 is being at least partially despun relative to the shell body 300 by automatic operation of the de-spin module 480, as disclosed herein, since ram air is flowing through the ram air inlet and out of the spin module 480 from the time of firing. At the same time, the relative rotation between the steering body 200 and the shell body 300 enables electrical power to be generated by the electrical generator 580, which in turn allows operation of the controller 500. This thereby enables full de-spin of the steering assembly 200 so that the steering assembly 200 is maintained at a stable orientation with respect to the Earth, and further enables controlled steering of the shell 100 to a desired target, for example using a suitable steering system, for example as disclosed herein with reference to FIG. 11 or FIG. 12.

It is to be noted that shell 100 can be made according to any suitable caliber, for example 0.5 inch, typically spinning at 130,000 rpm when fired, or 40 mm caliber, typically spinning at 70,000 rpm when fired, or indeed any other caliber, for example 20 mm, 30 mm, 40 mm, 57 mm, 105 mm and so on. At the low end, the smallest caliber possible for shell 100 generally depends on the ability to accommodate all the necessary components of the shell within the envelope afforded by the small caliber.

According to a second aspect of the presently disclosed subject matter there is provided a system and method for steering a shell, for example shell 100, to a target.

Figure 11:
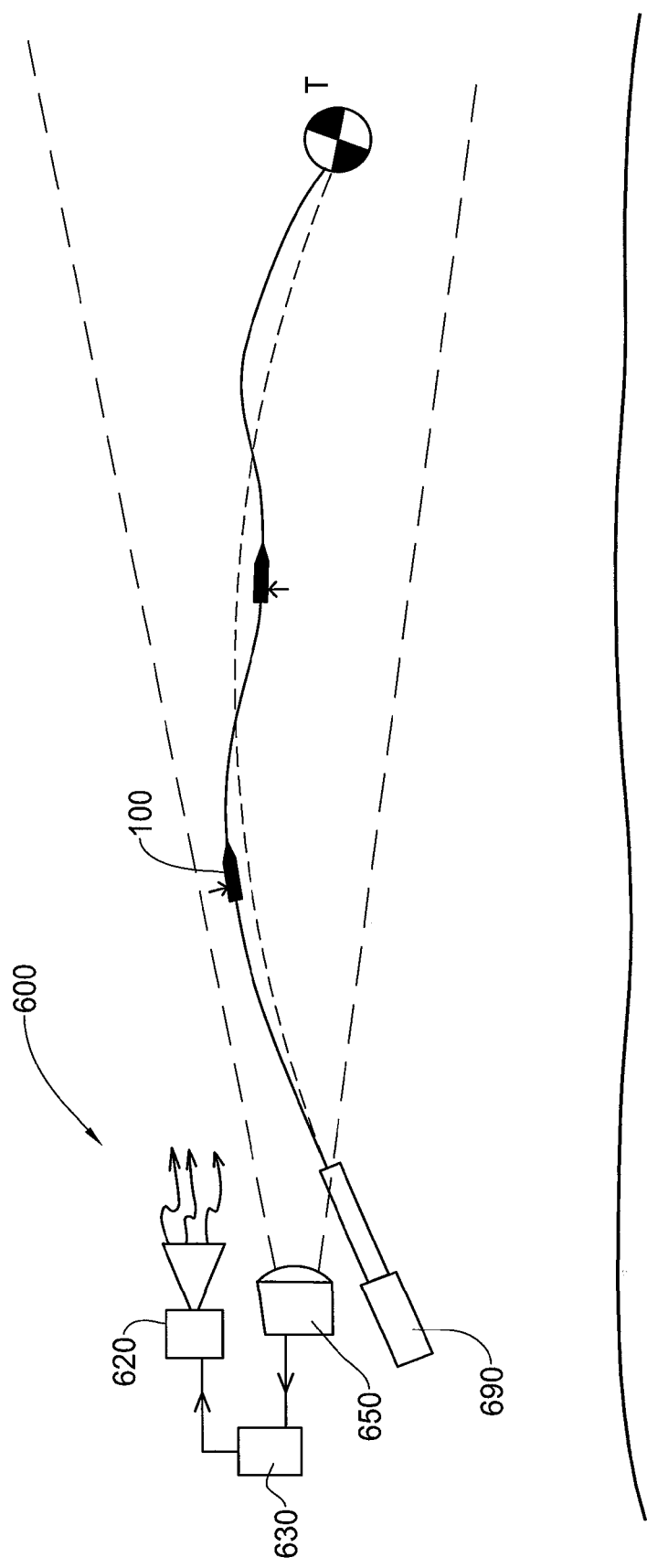
FIG. 11 schematically illustrates a first example of a steering system for a projectile according to a second aspect of the presently disclosed subject matter.

Referring to FIG. 11, a steering system for steering a shell to a target according to a first example of the presently disclosed subject matter, generally designated 600, is particularly configured for steering a shell, for example shell 100, towards a target, where the target exhibits low dynamic properties. Herein, by "low dynamic properties" is meant that (a) the target is a static target, or (b) that even though the target can be moving there is correspondingly low relative angular movement of the target with respect to an external sensor that is configured for tracking the shell and target—for example, the low angular movement of the target maintains the target within the field of view (FOV) of the sensor.

In one application according to the second aspect of the presently disclosed subject matter, the system configured for steering the shell, once fired, towards a target (having low dynamic properties), for example along a relatively shallow trajectory. For example, such a shallow trajectory can be defined as corresponding to the shell being fired at an initial elevation angle not greater than 20°. However, in other applications of the system according to the second aspect of the presently disclosed subject matter, the system can instead be used for steering the shell to a low-dynamic property target along a relatively steep trajectory.

Steering system 600 is particularly configured for use with a shell 100 as disclosed above for the first example thereof or alternative variations thereof, according to the first aspect of the presently disclosed subject matter, fired from a suitable weapons barrel 690. For example, the weapons barrel can include any one of: a 105 mm tank gun and the shell 100 is of corresponding caliber, for example 105 mm caliber; or a 50 mm Bushmaster Cannon or Bofors AA gun or a Barrett .50 inch caliber sniper weapon, and the shell 100 is of corresponding caliber, for example 50 mm caliber.

Thus, the system 600 comprises at least one shell 100, and can include the weapons barrel 690, and in this example, the respective antennas 572 of the shell 100 operate as downlink/uplink module 579, and in particular receive correction command signals from system 600 for steering the shell 100 to the desired target.

Steering system 600 comprises sensor system 650, transmitter 620, and control module 630. The control module 630 is operatively coupled to the sensor system 650 and to the transmitter 620.

The sensor system 650 is configured for providing imaging data of the shell 100 and the target T to enable sensing and determining the instantaneous spatial position of the shell 100 and of the target T during the trajectory of the shell 100 from a predetermined range from the target or from a predetermined time after being fired. For example sensor system 650 can be configured for providing image data of the instantaneous spatial position of the shell 100 and the target T from the time and position that the shell 100 is fired from the weapons barrel 690.

The sensor system 650 can include any suitable sensor, in particular an imaging system operating in the infra red (IR) and/or visual and/or ultraviolet spectrums. For example, the sensor system 650 can include at least one IR sensor, for example a thermal imaging camera (e.g. as provided by FLIR Systems, USA), operating in the 3 micron to 5 micron range or in the 8 micron to 12 micron range, or for example a shortwave IR camera (SWIR), operating in the 0.8 micron to 2 micron range.

In this example, the sensor system 650 selectively operates in track lock mode, so that the sensor system 650 is always locked onto the target T even if the target T is moving. For this purpose, the sensor system 650 comprises a suitable tilt and pan mechanism to move the sensor system 650 such as to maintain the target within the field of view of the sensor system 650.

Furthermore, in this example, the sensor system 650 also has crosshairs on the shell 100, and thus determines the position of the shell 100 relative to the target T, in terms of the spatial displacement between the target T and the shell 100 as imaged by the sensor system 650. In other words, the imaging provided by the sensor system 650 can give the position of the shell 100 relative to the target T in the x-y plane, while the actual range of the shell 100 can be estimated based on the elapsed time after being fired, and its expected speed. Optionally, the tracer configuration 578 of the shell 100 facilitates the sensor system 650 maintaining the crosshairs on the shell 100.

The transmitter 620 is configured for transmitting course correction command signals to the shell 100, responsive to receiving control signals from the control module 630. For example, transmitter 620 can be a radio transmitter configured for transmitting RF energy. For example, transmitter 620 transmits radio signals in the L-BAND.

The control module 630 comprises any suitable microprocessor system, configured for receiving image data from the sensor system 650 and for processing these images to provide relative positions between of objects (particularly between the shell 100 and the target T) captured in the images. The microprocessor system is also configured for determining whether a course correction is required for the shell 100, as well as for providing suitable control signals to the transmitter 620 to transmit course correction command signals to the shell 100 to effect a course correction.

The steering system 600 can operate as follows.

After the shell 100 has been fired from the weapons barrel 690, the sensor system 650 provides images or image data of the shell 100 and the target T during the trajectory of the shell 100, to the control module 630, while having a tracking lock on the target T.

The control module 630 determines whether a course correction is required for the shell 100, and if so generates suitable control signals to the transmitter 620 to transmit course correction command signals to the shell 100

For example, if the difference between the position of the shell 100 and of the target (in the x-y plane) as sensed by the sensor system, 650, is less than a predetermined threshold, no action is taken, and the shell 100 continues along its trajectory. On the other hand, if this difference exceeds the predetermined threshold, the microprocessor system determines what correction is required to bring the shell 100 back on course (in terms of the x-y plane), and how much thrust is needed from each of the exhaust outlets 420 to provide the required control moments in pitch and/or yaw to achieve this course correction. The microprocessor system then generates suitable control signals and passes these to the transmitter 620, which in turn transmits corresponding course correction command signals to the shell 100 to effect the required course correction.

The shell 100 receives these course correction command signals, and the controller 500 correspondingly opens one or more of the shut-off valves 450 for a specified period of time, as provided by the course correction command signals, to thereby generate a moment to the rotating shell body 300 about the position of the bearings, which in turn induces gyroscopic precession (nutation) of the shell 100 with respect to the longitudinal axis LA, and correspondingly induces a control moment to the shell 100 in an orthogonal direction. This causes a change in the angle of attack of the shell 100 and generates an aerodynamic side force which provides the required control moments in pitch and/or yaw to achieve this course correction.

The shell 100 continues to receive these course correction command signals until the target is hit.

A feature of the first example of the steering system 600 is that at least some false reflections from other objects near the target can be avoided.

Another feature of the first example of the steering system 600 is relatively insensitive to at least some false targets, because sensor can be locked on to the target from the start.

A feature of the first example of the steering system 600 is that it can be configured as a totally passive system, and does not require the target or the shell to be illuminated by the system; rather it uses electromagnetic energy naturally reflected therefrom and originating from other sources, for example the sun, or uses internal/intrinsic heat of the target, where the sensor system 650 includes thermal imaging systems.

Figure 12:
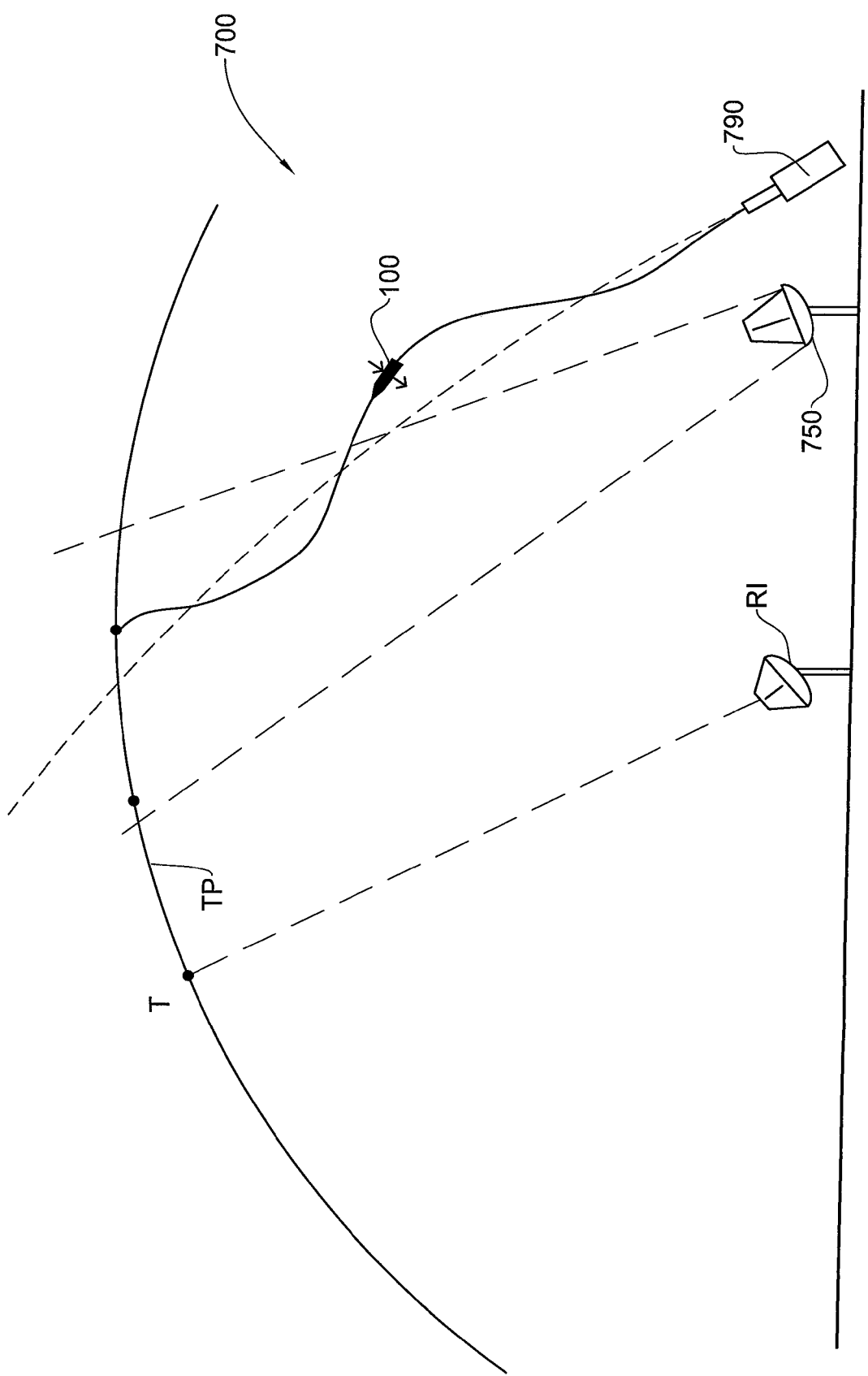
FIG. 12 schematically illustrates a second example of a steering system for a projectile according to a second aspect of the presently disclosed subject matter.
Figure 13:
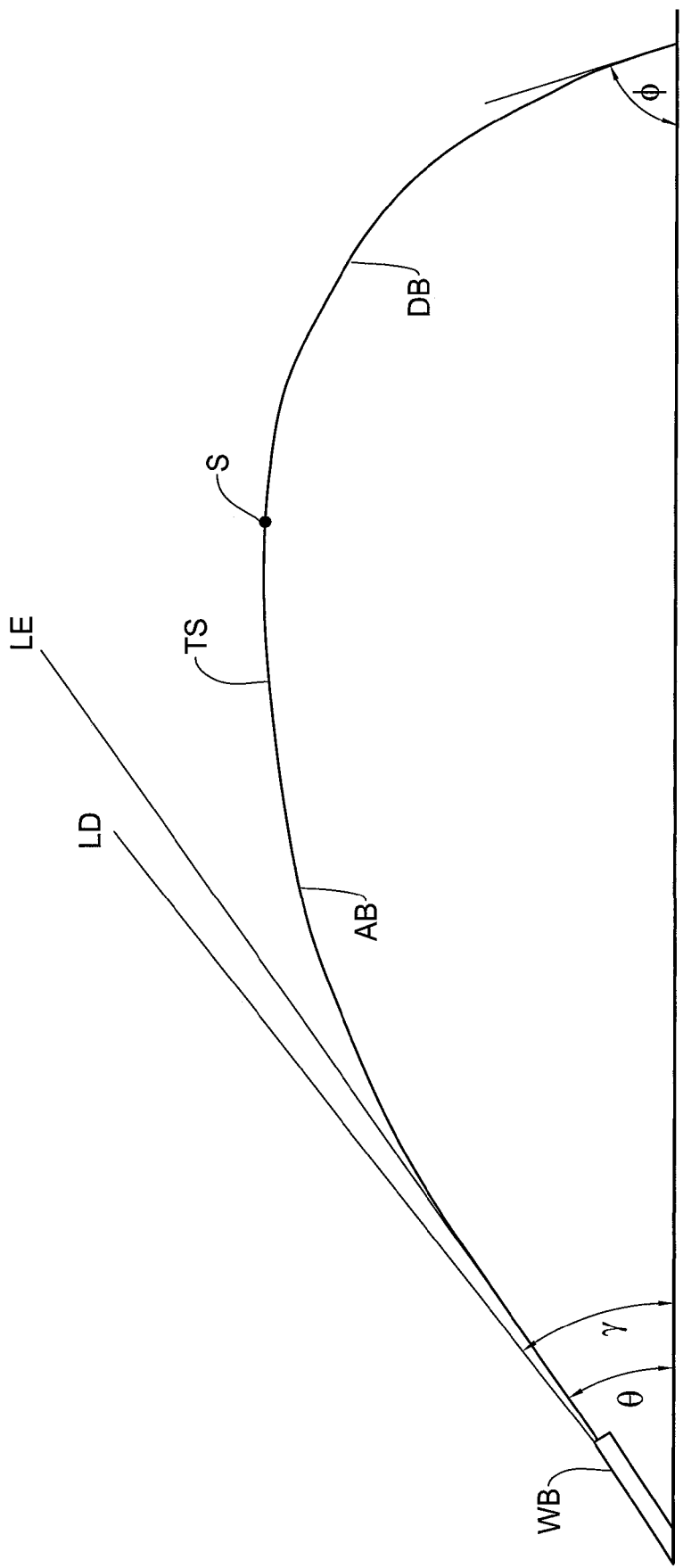
FIG. 13 schematically illustrates a conventional projectile trajectory.

Referring to FIG. 12, a steering system for steering a shell to a target according to a second example of the presently disclosed subject matter, generally designated 700, is particularly configured for steering a shell towards a target having significant dynamic movement and/or is at a relatively large range (one or both of which could render the first example of the system less effective, for example).

In one application according to the second aspect of the presently disclosed subject matter, the second example of the system is configured for steering the shell, once fired, to a target along a relatively steep trajectory. For example, such a shallow trajectory can be defined as corresponding to the shell being fired at an initial elevation angle of 20° or greater than 20°, for example 25°, 30°, 35°, 40°, 45°, 50°, 55°, 60°, 65°, 70°, 75°, 80°, 85°, 90° or any other elevation angle inbetween. Furthermore, in at least some applications of the second example of the steering system, the steering system is configured for intercepting an airborne target, for example an aircraft or hostile projectile.

Steering system 700 is particularly configured for use with a shell 100 as disclosed above for the first example thereof or alternative variations thereof, according to the first aspect of the presently disclosed subject matter, fired from a suitable weapons barrel 790, and in this example the antennas 572 are configured for operating as an on-board homing sensor for the shell 100. For example, the weapons barrel can include a 50 mm Bushmaster Cannon or 40 mm L70 Bofors gun, and the shell 100 is of corresponding caliber, for example 40 mm or 50 mm caliber.

Thus, the system 700 comprises at least one shell 100, and can include the weapons barrel 790.

Steering system 700 comprises an electromagnetic illuminator 750, configured for at least illuminating the target T with electromagnetic energy, which when reflected by the target can be received by antennas 572.

For example, illuminator 750 comprises a half-active radar, i.e., configured for illuminating a target with RF energy or laser energy, respectively, but that does not require to receive reflected signals. In alternative variations of this example, the illuminator 750 comprises an active radar, i.e., configured for illuminating a target with RF energy or laser energy, and for receiving reflected signals therefrom.

In yet other alternative variations of this example, the sensor function of the antennas 572 can be replaced with a suitable laser detector for receiving laser energy (the illuminator 750 being configured for transmitting laser energy and comprising, for example, a half-active ladar) and homing to target. In such an example the antennas 572 can operate as the downlink/uplink module for the shell.

In the example illustrated in FIG. 12, the antennas 572 together with the controller 500 of the shell 100 are configured for sensing and determining the instantaneous spatial position of the target T during the trajectory of the shell 100 from a predetermined range from the target or from a predetermined time after being fired, for example from the time and position that the shell 100 is fired from the weapons barrel 790. The controller 500 is configured for generating course correction command signals to the attitude control system 400, responsive to receiving input from the antennas 572.

The steering system 700 can operate as follows.

First, a threat or target T is detected, and its position determined, and the target T is tracked until it comes into the range of the weapons barrel 790. This can be accomplished for example by a regular radar installation RI. Then, the system 700 is activated, whereupon on receipt of suitable positional information from installation RI, the illuminator 750 illuminates the target T with suitable electromagnetic energy and concurrently the shell 100 is fired at an elevation and elevation such that its natural trajectory will nominally cause the shell 100 to intercept the target T as this continues along its trajectory TP.

At a certain point after the shell 100 is fired, the target T falls within the field of view of the antennas 572, and thus the antennas 572 begin to receive reflected electromagnetic from the target T. The antennas 572 provide a measure of the deviation of the trajectory of the shell 100 with respect to the actual position of the target T, and the controller 500 of the shell 100 determines what correction is required to bring the shell 100 back on course, and how much thrust is needed from each of the exhaust outlets 420 to provide the required control moments in pitch and/or yaw to achieve this course correction. The controller 500 then correspondingly opens one or more of the shut-off valves 450 for a specified period of time, as required, to thereby generate a moment to the rotating shell body 300 about the position of the bearings, which in turn induces gyroscopic precession (nutation) of the shell 100 with respect to the longitudinal axis LA, and correspondingly induces a control moment to the shell 100 in an orthogonal direction. This causes a change in the angle of attack of the shell 100 and generates an aerodynamic side force which provides the required control moments in pitch and/or yaw to achieve this course correction.

In an alternative variation of the second example, the downlink/uplink module can provide steering instructions to the shell 100 if required—for example for arriving at an optimal intersection point (instead of following a nominally ballistic trajectory). In other words, the radar installation RI and/or the illuminator 750 (which in such a case can be configured for receiving reflected radar signals from the target and/or the shell 100) can be used (via a suitable control system) to provide initial maneuvering instructions to the shell 100 via a suitable communications link, until the shell 100 is head-on with respect to the target T. The target is thus within the FOV of the antennas 572, after which the antennas 572 receive reflections from target and enables final steering to target T. For example, the electromagnetic illuminator 750 can be configured for illuminating a target with electromagnetic energy and also for receiving electromagnetic energy reflected by the target. For example, illuminator 750 comprises a fully-active radar or a fully-active ladar, i.e., configured for illuminating and detecting a target with RF energy or laser energy, respectively. Furthermore, the shell 100 is configured with said downlink 579, and is further configured for receiving/transmitting data with respect to the electromagnetic illuminator 750. In such a case, the electromagnetic illuminator 750 can provide positional data of the shell 100 and of the target T, and transmit suitable course correction command signals to the shell, and the controller 500 correspondingly opens one or more of the shut-off valves 450 for a period of time, as provided by the course correction command signals, to thereby generate a moment to the rotating shell body 300, which in turn causes a change in the angle of attack of the shell 100 and generating an aerodynamic side force which provides the required control moments in pitch and/or yaw to achieve this course correction. In such an example, the antennas 572 can optionally be omitted or not used for homing.

A feature of the first example of the steering system 700 is that in some applications, for example when the shell is fired along a relatively steep trajectory, since the weapons barrel 790 is typically facing the sky any potential false reflections can be avoided or minimized.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes can be made therein without departing from the spirit of the presently disclosed subject matter.

The invention claimed is:

1. A projectile configured for moving through a fluid medium, and having a longitudinal axis, the projectile comprising:
   a steering assembly;
   a shell body rotatably mounted to the steering assembly about the longitudinal axis;
   an attitude control system;
   a despin module;
   an electromagnetic receiver/emitter system; and
   a controller;
   wherein:
      the attitude control system comprises a ram air inlet in selective open fluid communication with an exhaust assembly via a fluid passageway provided in said steering assembly, the exhaust assembly comprising a plurality of exhaust outlets to selectively generate each of a plurality of thrust jets from a ram air inflow provided by said ram air inlet, each said thrust jet being selectively controllable via said controller to thereby generate steering control moments to the shell in operate thereof;
      the despin module is configured for selectively de-spinning said steering assembly with respect to said shell body about said longitudinal axis; and
      the electromagnetic receiver/emitter system is configured for at least one of receiving and emitting electromagnetic energy, and for cooperating with said controller for operating said exhaust assembly to thereby selectively provide said steering control moments;
      wherein said attitude control system, said despin module, said controller, and said electromagnetic receiver/emitter system, are comprised at least partially in said steering assembly.

2. The projectile according to claim 1, including one of the following:
   wherein said steering assembly comprises a nose portion of said shell, and wherein said ram air inlet is provided at a forward end of the nose portion;
   wherein said steering assembly comprises a nose portion of said shell, and wherein said ram air inlet is provided at a forward end of the nose portion, and, wherein said shell body comprises an external casing extending aft from a front edge thereof to an aft shell end, and wherein said front edge is axially spaced by a gap from said nose portion; or
   wherein said steering assembly comprises a nose portion of said shell, and wherein said ram air inlet is provided at a forward end of the nose portion, and, wherein said shell body comprises an external casing extending aft from a front edge thereof to an aft shell end, and wherein said front edge is axially spaced by a gap from said nose portion, and, wherein said aft external casing overlies an aft portion of the steering assembly, including said attitude control system and said despin module.

3. The projectile according to claim 2, wherein said electromagnetic receiver/emitter system comprises a plurality of antennas.

4. The projectile according to claim 3, including at least one of the following:
wherein said antennas are provided in said nose portion;
wherein said antennas are conformal with an outer surface of said nose portion;
wherein said antennas are monopole antennas;
comprising four said antennas, accommodated in said nose portion in cruciform arrangement;
wherein said antennas are configured for operating as a downlink/uplink module, operatively coupled to said controller;
wherein said antennas are configured for receiving RF signals;
wherein said antennas are configured for receiving RF signals, and, wherein said controller is configured for controlling a trajectory of said shell via said attitude control system based on said RF signals when received by said antennas;
wherein said antennas are configured for receiving RF signals, and, wherein said controller is configured for controlling a trajectory of said shell via said attitude control system based on said RF signals when received by said antennas, and, wherein said RF signals are transmitted by a ground station and are configured for providing navigation instructions to said controller for controlling said trajectory; or
wherein said antennas are configured for receiving RF signals, and, wherein said controller is configured for controlling a trajectory of said shell via said attitude control system based on said RF signals when received by said antennas, and, wherein said RF signals are reflected by an illuminated target to said antennas, and wherein said controller is configured for controlling said trajectory based on differences between the RF signals received by each of said antennas.

5. The projectile according to claim 3, including at least one of:
wherein said antennas are configured for emitting RF signals; and
wherein said antennas are configured for emitting RF signals, and, wherein said transmitted RF signals include information relating to at least one of the following: position of said shell, velocity of said shell.

6. The projectile according to claim 1, wherein said exhaust assembly comprises a plurality of shut-off valves corresponding to said plurality of said exhaust outlets, wherein each shut-off valve is controllable via said controller to selectively open and close fluid communication between the corresponding exhaust outlets and said ram air inflow provided via the ram air inlet during operation of the shell, to selectively enable said steering control moments to be generated.

7. The projectile according to claim 6, including one of the following:
wherein said steering assembly is rotatably mounted to said shell body via a bearing arrangement;
wherein said steering assembly is rotatably mounted to said shell body via a bearing arrangement, and, wherein said bearing arrangement is axially located in a vicinity of said gap; or
wherein said steering assembly is rotatably mounted to said shell body via a bearing arrangement, and, wherein said bearing arrangement is axially located in a vicinity of said gap, and, wherein said bearing arrangement is configured for allowing axial movement between said steering assembly and said shell body to close said gap responsive to said shell being accelerated, and for re-opening said gap when the acceleration is terminated.

8. The projectile according to claim 1, further comprising a plurality of first openings in said shell body in the vicinity of said exhaust assembly for allowing evacuation of exhaust gases generated by said attitude control system.

9. The projectile according to claim 1, including one of the following:
wherein said despin module comprises a generally cylindrical body including a central passageway, a central valve, and a despin thruster arrangement;
wherein said despin module comprises a generally cylindrical body including a central passageway, a central valve, and a despin thruster arrangement, and, wherein said fluid passageway is in selective fluid communication with central passageway via said central valve;
wherein said despin module comprises a generally cylindrical body including a central passageway, a central valve, and a despin thruster arrangement, and, wherein said despin thruster arrangement comprises two exhaust passageways extending from said central valve, each exhaust passageway comprising a respective tangential exhaust outlet at an outer end thereof for selectively generating thereat a tangential jet thrust from a ram air inflow selectively provided by said ram air inlet via said central valve; or
wherein said despin module comprises a generally cylindrical body including a central passageway, a central valve, and a despin thruster arrangement, and, further comprising a plurality of second openings in said shell body in the vicinity of said despin module for allowing evacuation of exhaust gases generated by said despin thruster arrangement.

10. The projectile according to claim 1, including at least one of the following:
wherein said shell body comprises a driving band made from a gliding metal;
further comprising an electrical generator for generating electrical power during operation of the shell, responsive to a relative rotational movement between the steering assembly and the shell body;
further comprising an electrical generator for generating electrical power during operation of the shell, responsive to a relative rotational movement between the steering assembly and the shell body, and, wherein said electrical generator comprises magnets provided in the shell body in lateral registry with coils provided in the steering assembly; or
wherein said shell further comprises a tracer configuration for facilitating tracing the shell after being fired.

11. The projectile according to claim 1, wherein said shell is configured such that operation of said attitude control system to generate a thrust force by exhausting via a respective said exhaust outlets a ram airflow provided from said ram air inlet applies a control moment in at least one of pitch and yaw to the rotating shell body, which induces gyroscopic precession of said shell with respect to the longitudinal axis, and correspondingly induces a control moment to the shell in an orthogonal direction to said thrust force and said longitudinal axis to thereby correspondingly change an angle of attack of said shell, inducing an aerodynamic lateral force on said shell for changing the trajectory thereof in a desired direction.

12. The projectile according to claim 1, wherein said ram air inlet is provided in said steering assembly.

13. A method for steering a projectile moving through a fluid medium towards a target, the method comprising:
providing at least one projectile as defined in claim 1;
firing the at least one projectile from a weapons barrel;
providing imaging data of the fired projectile and of the target;
processing said image data to selectively provide control signals, and transmitting course correction command signals to the projectile based on said control signals; and
causing said at least one projectile to effect a course correction responsive to receiving said course correction command signals.

14. The method according to claim 13, including at least one of:
wherein said image data is provided by a sensor system, and selectively operating sensor system in a track lock mode, wherein the sensor system is continuously locked onto the target;
comprising determining a position of the shell relative to a position of the target; or
wherein said projectile is fired along a shallow trajectory towards the target.

15. A method for steering a projectile moving through a fluid medium towards a target, the method comprising:
providing at least one projectile as defined in claim 1;
firing the at least one projectile from a weapons barrel;
illuminating the target with electromagnetic energy such that said fired projectile can receive reflected electromagnetic energy from the target; and
causing said at least one projectile to effect a course correction responsive to receiving said reflected electromagnetic energy from the target.

16. The method according to claim 15, including at least one of:
wherein said electromagnetic energy is provided by any one of an active radar and a half-active radar;
wherein said projectile operates such that the antennas thereof together with the controller thereof are sense and determine the instantaneous spatial position of the target during at least a portion of the trajectory of the shell from any one of a predetermined range from the target and a predetermined time after being fired, and wherein the controller generates course correction command signals to the attitude control system, responsive to receiving input from the antennas; or
wherein said projectile is fired along a shallow trajectory towards the target.

17. A system for steering a projectile moving through a fluid medium towards a target, the system comprising:
at least one projectile configured for moving through a fluid medium, and having a longitudinal axis, and further configured to be fired from a weapons barrel, the projectile comprising:
a steering assembly;
a shell body rotatably mounted to the steering assembly about the longitudinal axis;
an attitude control system;
a despin module;
an electromagnetic receiver/emitter system; and
a controller;
wherein:
the attitude control system comprises a ram air inlet in selective open fluid communication with an exhaust assembly via a fluid passageway provided in said steering assembly, the exhaust assembly comprising a plurality of exhaust outlets to selectively generate each of a plurality of thrust jets from a ram air inflow provided by said ram air inlet, each said thrust jet being selectively controllable via said controller to thereby generate steering control moments to the shell in operate thereof;
the despin module is configured for selectively despinning said steering assembly with respect to said shell body about said longitudinal axis; and
the electromagnetic receiver/emitter system is configured for at least one of receiving and emitting electromagnetic energy, and for cooperating with said controller for operating said exhaust assembly to thereby selectively provide said steering control moments;
a sensor system, configured for providing imaging data of the fired projectile and of the target;
a transmitter; and
a control module operatively coupled to said sensor system and to said transmitter, wherein the control module is configured for receiving image data from the sensor system and for processing these image data to selectively provide control signals to said transmitter;
wherein said transmitter is configured for transmitting course correction command signals to the projectile, responsive to receiving said control signals and corresponding thereto;
wherein said projectile is configured to effect a course correction responsive to receiving said course correction command signals.

18. The system according to claim 17, including at least one of the following:
further comprising said weapons barrel;
wherein the sensor system includes an imaging system operating in at least one of an infra-red (IR), a visual, and an ultraviolet spectrums;
wherein said sensor system is configured for selectively operating in a track lock mode, wherein the sensor system is continuously locked onto the target;
wherein said sensor system is configured for determining a position of the shell relative to a position of the target; or
wherein the system is configured for firing said projectile along a shallow trajectory.

19. A system for steering a projectile moving through a fluid medium towards a target, the system comprising:
at least one projectile configured for moving through a fluid medium, and having a longitudinal axis, and further configured to be fired from a weapons barrel, the projectile comprising:
a steering assembly;
a shell body rotatably mounted to the steering assembly about the longitudinal axis;
an attitude control system;
a despin module;
an electromagnetic receiver/emitter system; and
a controller;
wherein:
the attitude control system comprises a ram air inlet in selective open fluid communication with an exhaust assembly via a fluid passageway provided in said steering assembly, the exhaust assembly comprising a plurality of exhaust outlets to selectively generate each of a plurality of thrust jets from a ram air inflow provided by said ram air inlet, each said thrust jet being selectively controllable via said controller to thereby generate steering control moments to the shell in operate thereof;

the despin module is configured for selectively de-spinning said steering assembly with respect to said shell body about said longitudinal axis; and the electromagnetic receiver/emitter system is configured for at least one of receiving and emitting electromagnetic energy, and for cooperating with said controller for operating said exhaust assembly to thereby selectively provide said steering control moments; and an electromagnetic illuminator configured for illuminating the target with electromagnetic energy such that said fired projectile can receive reflected electromagnetic energy from the target;

wherein said projectile is configured to effect a course correction responsive to receiving said reflected electromagnetic energy from the target.

20. The system according to claim 19, including at least one of the following:

further comprising said weapons barrel;

wherein said electromagnetic illuminator comprises any one of an active radar and a half-active radar;

wherein said projectile is configured such that the electromagnetic receiver/emitter system thereof together with the controller thereof are configured for sensing and determining the instantaneous spatial position of the target during at least a portion of the trajectory of the shell from one of a predetermined range from the target and a predetermined time after being fired, and wherein the controller is configured for generating course correction command signals to the attitude control system, responsive to receiving input from the electromagnetic receiver/emitter system; or wherein the system is configured for firing said projectile along a steep trajectory.

* * * * *